United States Patent [19]
Yamamoto et al.

[11] Patent Number: 5,029,811
[45] Date of Patent: Jul. 9, 1991

[54] BUTTERFLY VALVE

[75] Inventors: Takeshi Yamamoto, Nishinomiya; Toshiharu Tanaka, Daitoh, both of Japan

[73] Assignee: Tomoe Technical Research Company, Ohsaka, Japan

[21] Appl. No.: 497,846

[22] Filed: Mar. 23, 1990

[30] Foreign Application Priority Data

| Mar. 31, 1989 | [JP] | Japan | 1-81253 |
| Apr. 10, 1989 | [JP] | Japan | 1-41766[U] |
| Jun. 29, 1989 | [JP] | Japan | 1-76901[U] |
| Jul. 21, 1989 | [JP] | Japan | 1-85887[U] |
| Oct. 2, 1989 | [JP] | Japan | 1-257273 |

[51] Int. Cl.$^5$ ............................................ F16K 1/226
[52] U.S. Cl. ................................... 251/306; 251/367
[58] Field of Search ............... 251/305, 306, 307, 308, 251/152, 367, 368, 314, 317

[56] References Cited

U.S. PATENT DOCUMENTS

| 3,567,180 | 9/1969 | Williams | 251/306 |
| 4,241,897 | 12/1980 | Maezawa | 251/229 |
| 4,826,133 | 5/1989 | Hiltebrand | 251/306 |

Primary Examiner—Martin P. Schwadron
Assistant Examiner—Kevin Lawrence Lee
Attorney, Agent, or Firm—Staas & Halsey

[57] ABSTRACT

A butterfly valve is described, including: a valve body made from synthetic material and having an internal cylindrical fluid passage; a movable disk valve disposed in the valve body for controlling the opening and closing of the fluid passage; a seated ring made from elastic material inserted between the valve body and the disk valve for closing the fluid passage when the disk valve is in a closed position; a shaft hole formed in the valve body into which a stem is inserted; a shaft cylinder formed to extend outwardly from an outer circumference of the valve body in corresponding with the shaft hole, the stem being inserted into the shaft cylinder and holding the valve axially, the valve body being divided along at least one division line formed across the fluid passage and being composed of plural divided parts, each divided part being joined at a joining surface extending circumferentially to form one complete valve body and being produced with a plurality of cavity portions in order to achieve light weight and required thickness, and the seated ring being fitted into an inner circumference of the valve body.

36 Claims, 28 Drawing Sheets

BUTTERFLY VALVE

BACKGROUND OF THE INVENTION

This invention relates to a butterfly valve which controls flow regulation of various fluids, and more particularly relates to the butterfly valve in which the valve body is constructed by synthetic resin material.

In the prior art, butterfly valves have been well known and used in handling various fluids, and generally they consist of a metal disk valve pivoted rotatably on a shaft in a cylindrical flow passage formed inside of a valve body, and between the valve body and the valve, and an elastic sealing material, a so-called seated ring, are adapted to open or close the flow passage and are adapted to control the fluid flow by contacting or detaching the outer circumferential surface of the disk valve on or from the inner circumferential surface of the seated ring.

The valve body equipped with such a butterfly valve having a cylindrical flow passage is generally provided as a one piece metal body by casting production or forging. The disadvantage to this one piece metal body is that it is quite difficult to obtain a light weight and compact body by e.g., reducing the inside thickness of the metal body during production. With regard to the casting production process, spruce burs or other burs are unavoidable during the process, which requires extra treatment inviting high costs in order to produce a smooth surface in the inner body or a smooth flow hole. Further, this casting process creates various problems such as unhealthy conditions or a bad environment for workers caused by harmful dust or residue.

In view of these situations, the present inventor has developed a valve body constructed of synthetic resin material, and including plural parts sectioning the body, and to join them together as a one piece valve body.

In an effort to realize light weight for these valve bodies, the following approaches were used in the past.

One prior approach teaches that the valve body and the valve be made of a compound material such as polyvinyl chloride or polypropylene or some other plastic material, but the valve body itself be produced as a one piece body, which does not differ at all essentially with the thought of producing a one piece metal valve body in the initial art. By this approach, in order to attain the mechanical strength for the valve body, it is necessary to form a projecting portion in the form of a rib-like member, and therefore, the total size of the valve body becomes too big in comparison with the diameter of the fluid passage.

There are also some other prior art approaches including a valve body made from synthetic resin material such as vinyl chloride and so on, but they are almost all produced in the similar method as explained above as a one piece body, and some are equipped with a similar rib-like member.

All of these prior art approaches provide a one piece valve body made from synthetic resin material, and the production method of a one piece body cannot be practiced in such a way as to eliminate the thickness of the inner parts. During the production procedure of synthetic resin products, when thickness is increased, it tends to cause bubbles therein, wherefore the cooling process invites the formation of hollowed portions. This serious problem is unavoidable during the production of a synthetic resin valve body produced by the prior art. In order to avoid this problem, the rib-like projecting portion is absolutely necessary to decrease the thickness. This projecting portion, however, is forced to encroach upon some larger space and thus the valve body becomes very big in comparison with the fluid passage, namely the effective diameter. This is really a fatal defect.

U.S. Pat. No. 4,826,133 discloses a butterfly valve body which is constituted by two parts, each part divided along the vertical line crossing the fluid passage and adapted to be completed by bolt-nut connecting each part. This patent is applicable to a metal valve body, but it is quite difficult or almost impossible to apply the same teaching to a valve body made from synthetic resin material. resin material suffers from shrinkage and expansion caused by water or hysteresis. According to the Patent, when two parts are combined, a kind of seated ring consisting of elastic sealing material is supplied therebetween, and the two parts are tightly locked by the bolt-nut connection, and therefore the sealing is attained by elastic deformation of the seated ring. Accordingly, if resin material were used instead of metal, the resin material has the nature of far larger shrinkage and expansion compared with metal, whereas the effective sealing would deteriorate with time, which tends to invite leakage of fluid badly during operation. Thus, the resin material is actually impossible to use according to the teaching of the patent.

In addition, the valve body is connected with a seated ring made from elastic sealing material and it is also fastened tightly by the bolt-nut means established at many points around the valve body, and thus, the valve body and the seated ring are assembled into one piece. Under this structure, when the replacement of the seated ring is necessary, the valve must be dismantled. In consequence, the exchange of the seated ring means the re-assembling of the whole valve body including the valve itself, which is quite troublesome and time consuming, such as unscrewing the bolt-nut means, refastening, fitting, adjusting, confirming and so on.

On the other hand, there lies a suggestion to use the very high quality resin which is called "Engineering Plastics", so that it guarantees the desirable sturdiness of the valve body without establishing the projecting portion with rib-like substance, but this kind of material is very expensive and is unsuitable for the expected cost of the butterfly valve. Moreover, even if this high quality resin is adopted, it still cannot eliminate other defects, such as the occurence of bubbles causing hollowed portions and so on.

In view of these serious problems, this invention has been developed.

SUMMARY OF THE INVENTION

This invention has an object to provide a butterfly valve, wherein the valve body consists of plural parts made from synthetic resin material, each part being divided along the vertical line crossing the fluid passage, and each part is combined together for the complete valve body thereafter, having enough mechanical strength which eliminates the need for a projecting portion formed by the rib-like substance and also eliminates the extra thickness causing the occurrence of bubbles.

This invention has the other object to provide a butterfly valve, wherein the plural parts are connected by melt welding to obtain the satisfactory sealing on the joining spots so that it avoids the leakage, and also the fittings or the exchange of the seated ring can be made easily and simply.

The present invention has a further object to provide a butterfly valve, wherein each size of the plural parts is chosen so that the joining spots do not create an ugly appearance.

This invention further has an object to provide a valve body, wherein melt welding is performed so as to eliminate the occurrance of burs which requires some extra treatment.

The invention has a further object to provide a valve body, wherein the form of each part is freely selected to be symmetrical or non-symmetrical with the center of the shaft so that any assortment of corresponding parts can be utilized.

The invention has a further object to provide a butterfly valve, wherein the synthetic resin material valve body is adapted to be light weight as well as to enhance the durability of a shaft strut extending outward in order to sustain axially a stem from the outer circumferential surface of the valve body.

This invention has a further object to provide a butterfly valve, wherein the resin material valve body is equipped with a mechanism which guarantees correct seating of the stem without slipping out as well as guarantees the simple insertion of the stem.

The invention has a further object to provide a butterfly valve, wherein the resin material valve body is equipped with a mechanism to arrange and to fit the butterfly valve easily with the piping connection when the butterfly valve is held and fixed between the piping flanges.

This invention has a further object to provide the butterfly valve, wherein the resin material valve body is equipped with a spacer which prevents the valve body from the overload of holding pressure as well as prevents piping flanges from moving down inwardly when the butterfly valve is held and fixed between the piping flanges.

The other advantages and characteristics become more apparent by the following description.

This invention relates to a butterfly valve in which a valve body is made from synthetic resin material where the valve body is made from plural divided parts, each part being divided and joined correctly by welding or adhesive means into one complete body, thereafter guaranteeing the satisfactory sealing therebetween without incurring leakage. A seated ring is prepared separately from elastic sealing material while a disk valve is also prepared from metal or synthetic resin material, and the seated ring is inserted between the valve body and a disk valve for proper operation. During the production procedures for the divided parts, plural cavity portions are established for each part, which eliminates the inconvenience of thick dimensions and also results in a sturdiness by using a so-called honeycomb structure made by joining each part correctly, and these cavity portions are light weight and compact.

Other devices are also realized in this invention, by which a desirable butterfly valve is obtained from the synthetic resin material and which is sturdy, light weight, compact, durable, easy setting, and other characterics which cannot be attained by the prior art economically.

BRIEF DESCRIPTIONS OF THE DRAWINGS

FIG. 38~FIG. 47 are various other embodiments for the divided parts.

Figure 38:
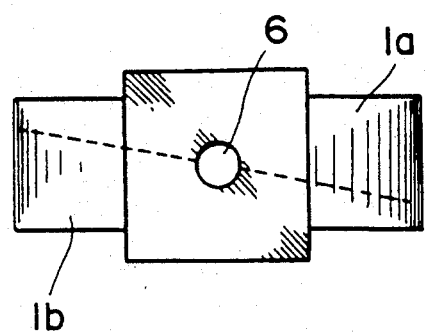
Figure 39:
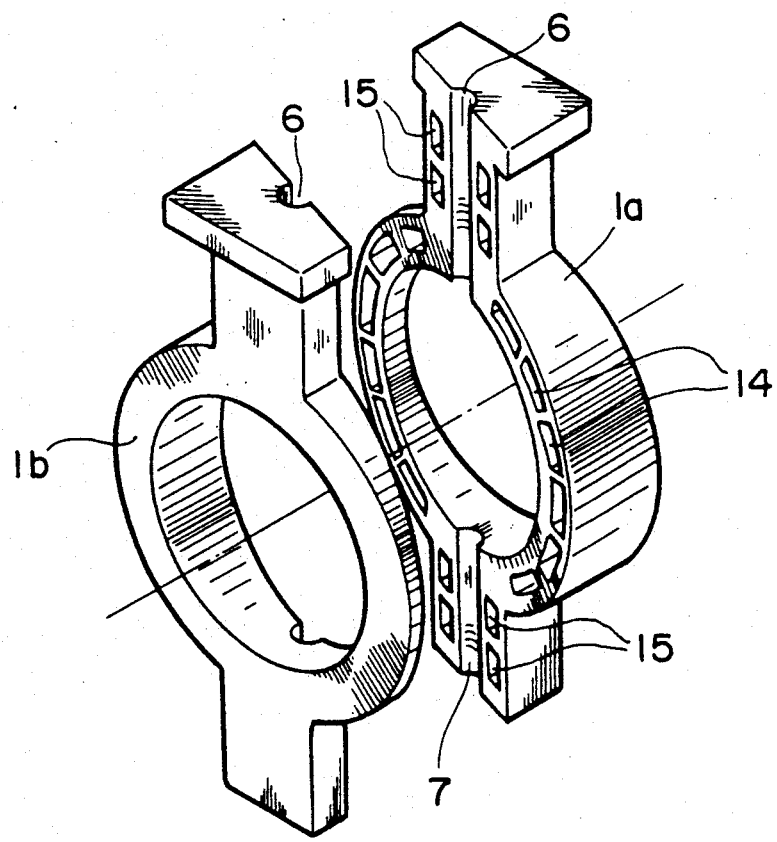
Figure 40:
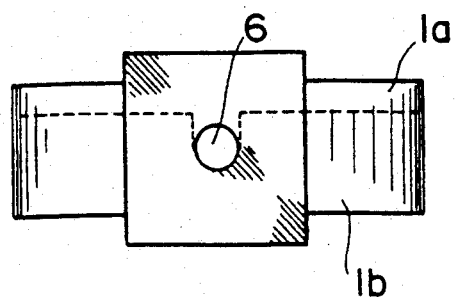
Figure 41:
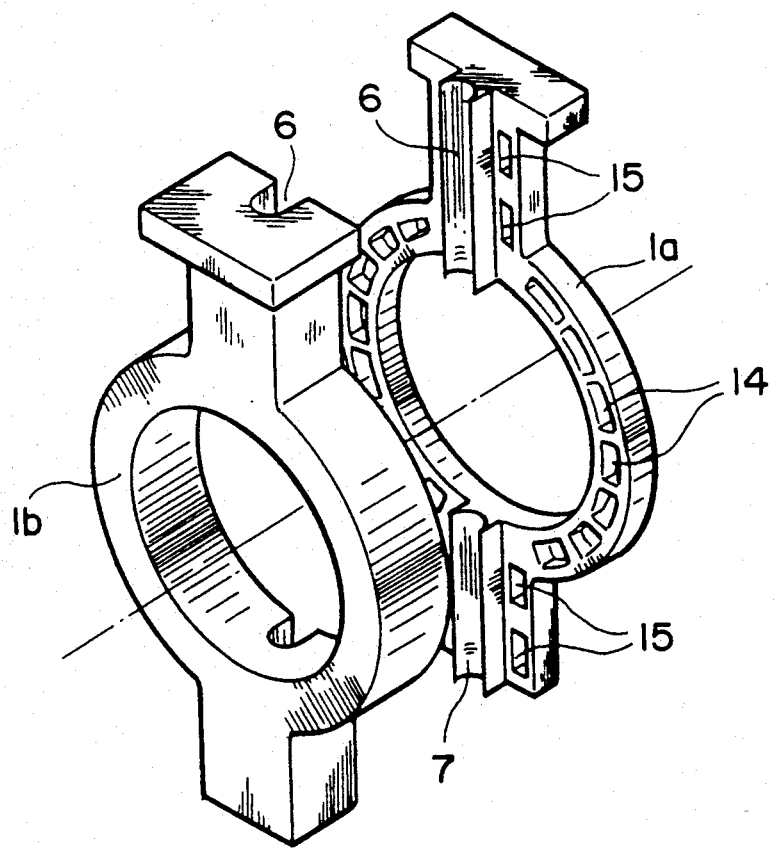
Figure 42:
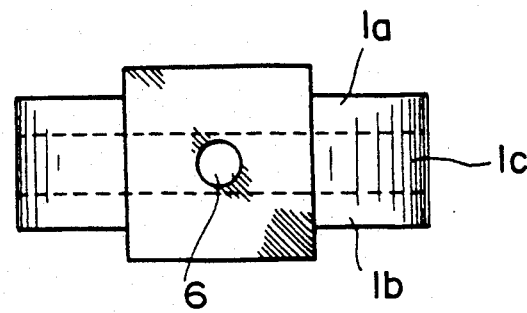
Figure 43:
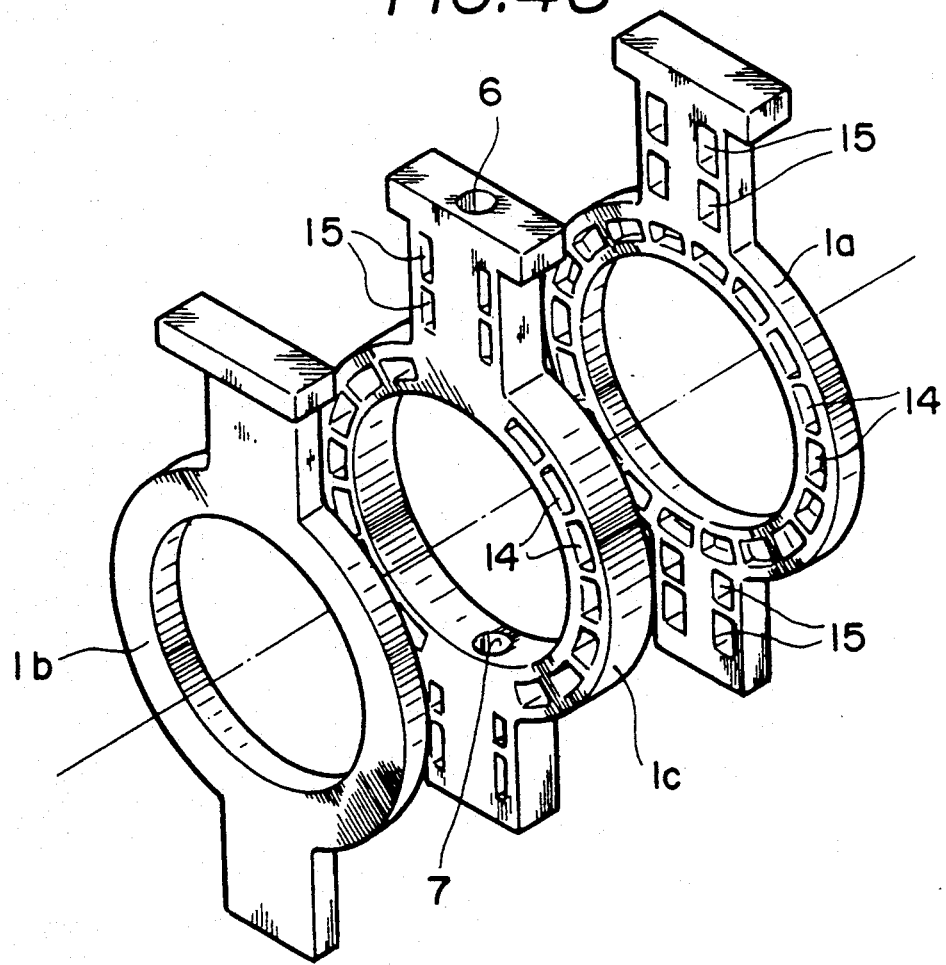
Figure 44:
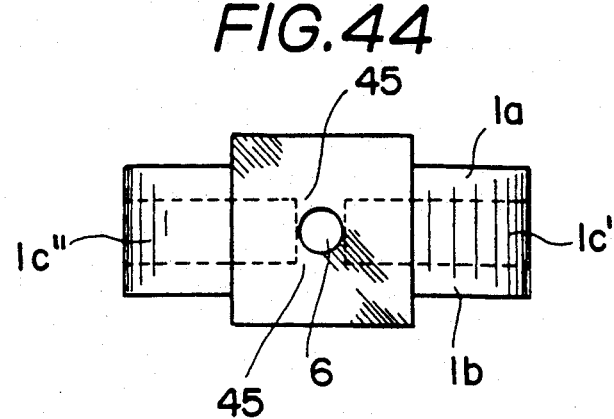
Figure 45:
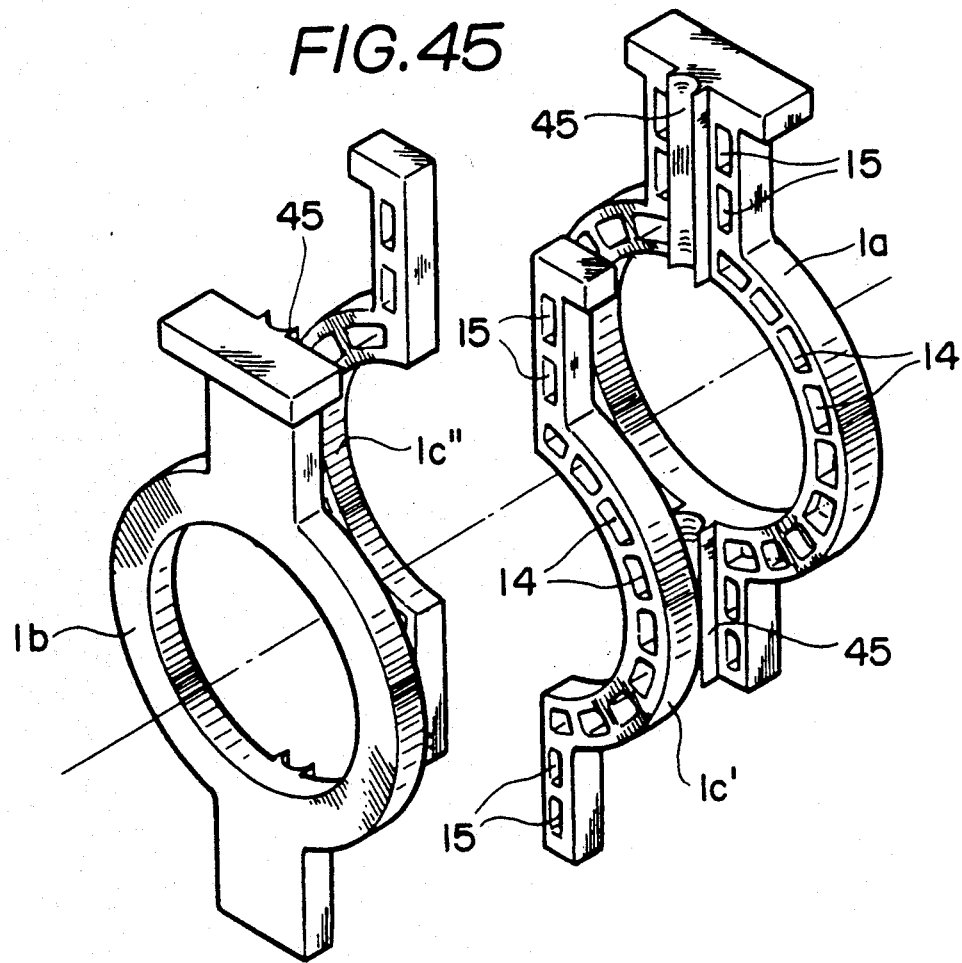
Figure 46:
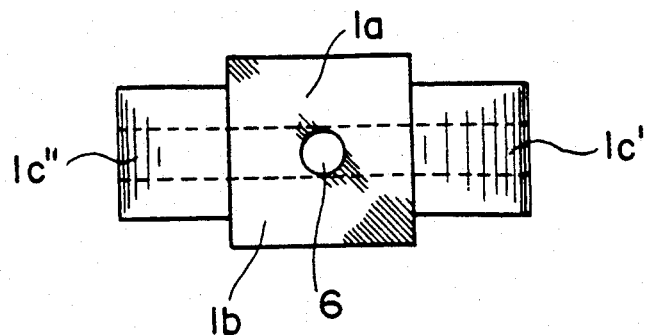
Figure 47:
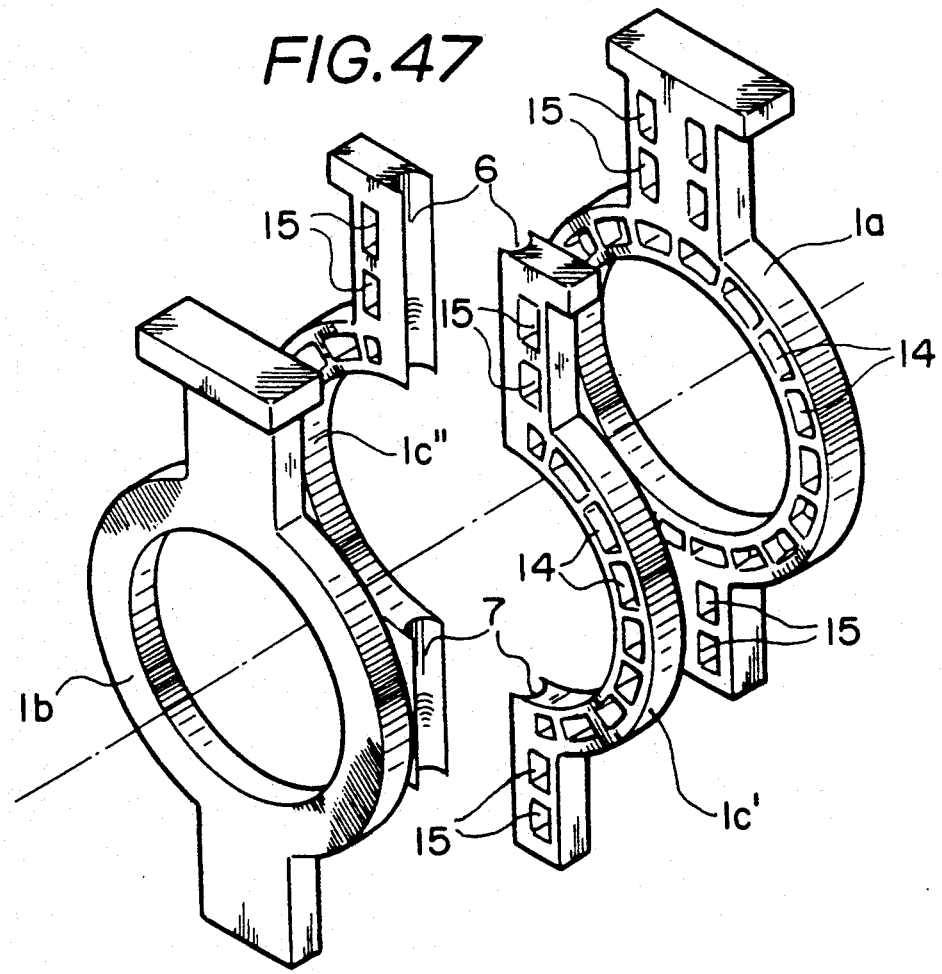

FIG. 38 is a flat view of a first embodiment.
FIG. 39 is a perspective view of FIG. 38.
FIG. 40 is a flat view of the second embodiment.
FIG. 41 is a perspective view of FIG. 40.
FIG. 42 is a flat view of the third embodiment.
FIG. 43 is a perspective view of FIG. 42.
FIG. 44 is a flat view of the fourth embodiment.
FIG. 45 is a perspective view of FIG. 44.
FIG. 46 is a flat view of the fifth embodiment.
FIG. 47 is a perspective view of FIG. 46.

Figure 48:
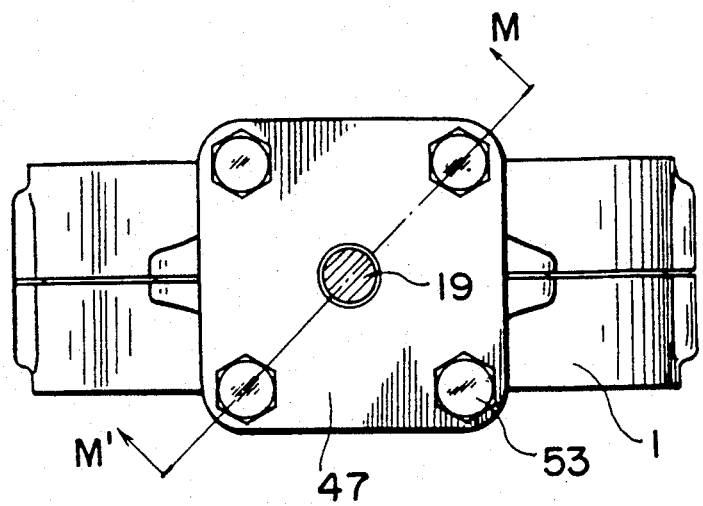
Figure 49:
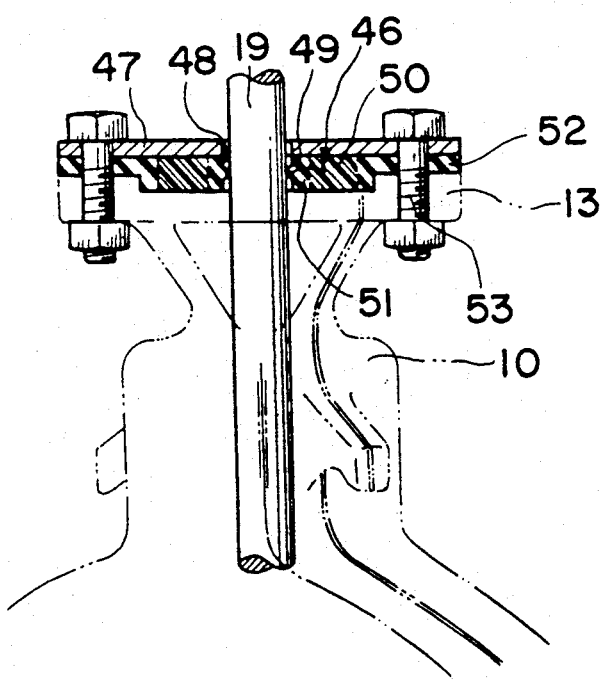
Figure 50:
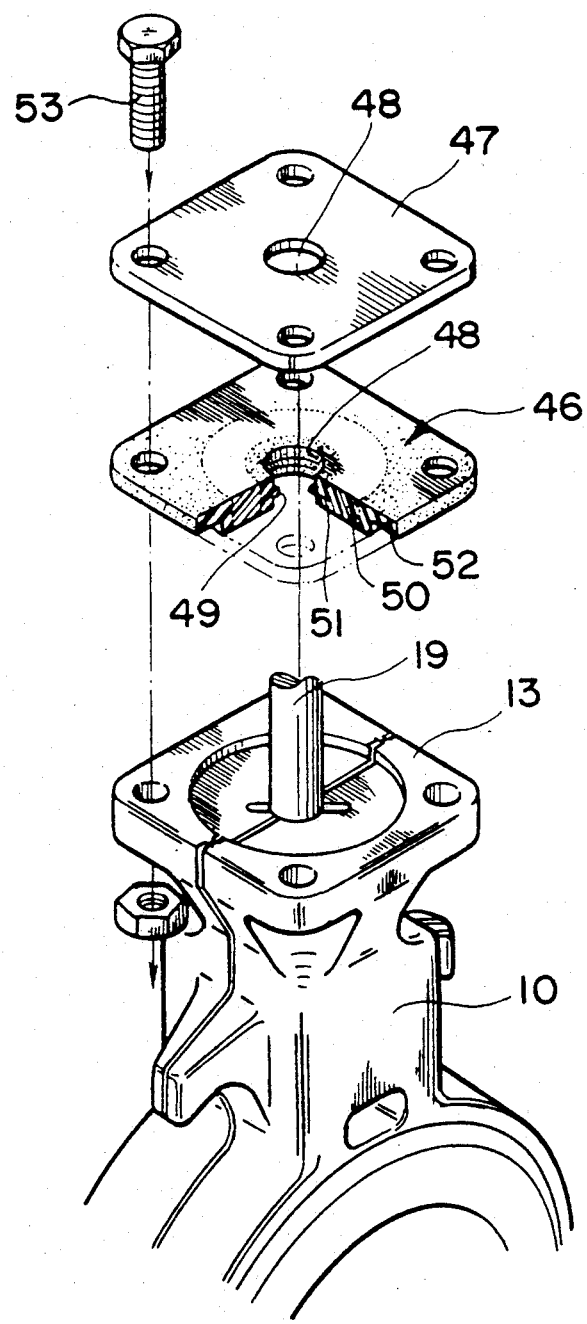

FIG. 48~FIG. 50 show an example of how the stem on the driving side can be sealed.

FIG. 48 is a flat view of the above example.
FIG. 49 is a sectional view of FIG. 48 along the line M—M'.
FIG. 50 is an exploded perspective view of FIG. 48.

Figure 51:
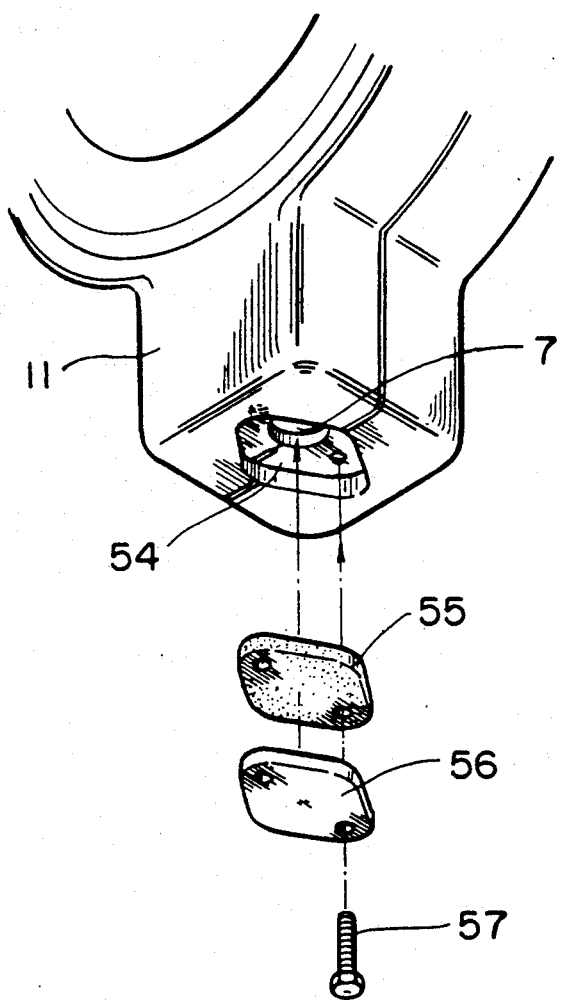
Figure 52:
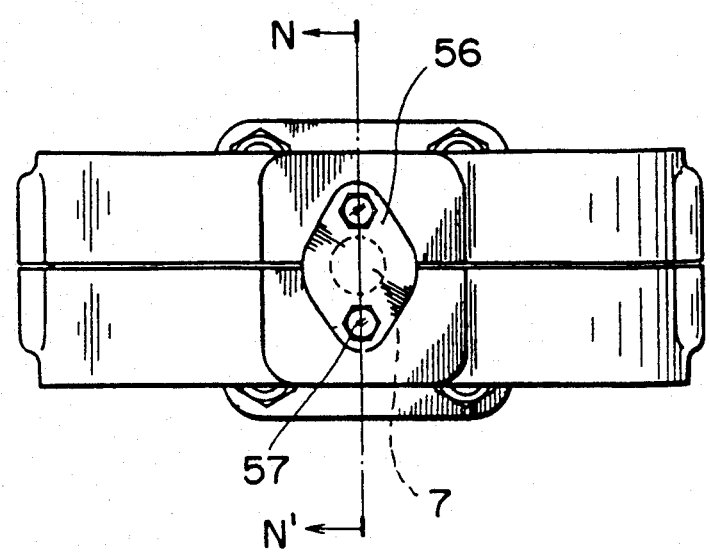
Figure 53:
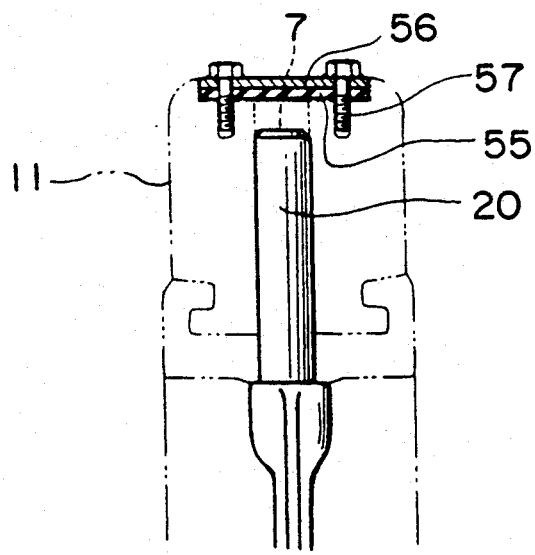

FIG. 51~FIG. 53 show an example how the stem on the opposite side can be sealed.

FIG. 51 is an exploded perspective view of the sealing.
FIG. 52 is a bottom view of the sealing shown in FIG. 51.
FIG. 53 is a sectional view of FIG. 51 along the line N—N'.

DESCRIPTION OF THE PREFERRED EMBODIMENTS

Figure 3:
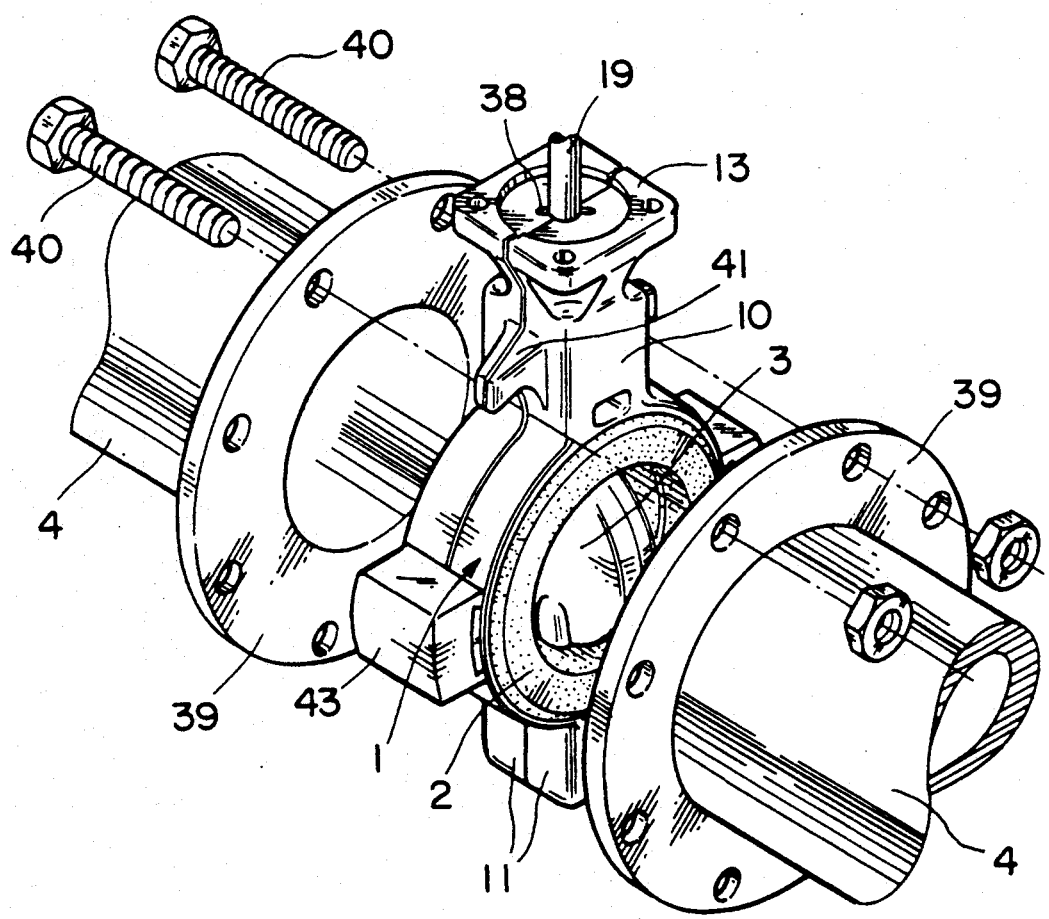
FIG. 3 is a perspective view of the valve just before fitting the same with the piping.

A butterfly valve in this invention comprises: A valve body(1) made from synthetic resin material having a fluid passage running axially in a cylindrical shape; a metal or synthetic resin disk valve(3) sustained rotatably on a shaft in the inside of the valve body(1); and a seated ring(2) made from elastic sealing material like rubber to be inserted between the valve body(1) and the valve(3). As shown in FIG. 3, the valve body(1) is installed in an applicable pipe, being pinched between flanges(39)(39) each attached to a pipe(4) and the butterfly valve is operated from the outside for controlling the opening and closing of the fluid passage contacting the outer circumferential surface of the valve(3) onto or from the inner circumferential surface of the seated ring(2).

Figure 1:
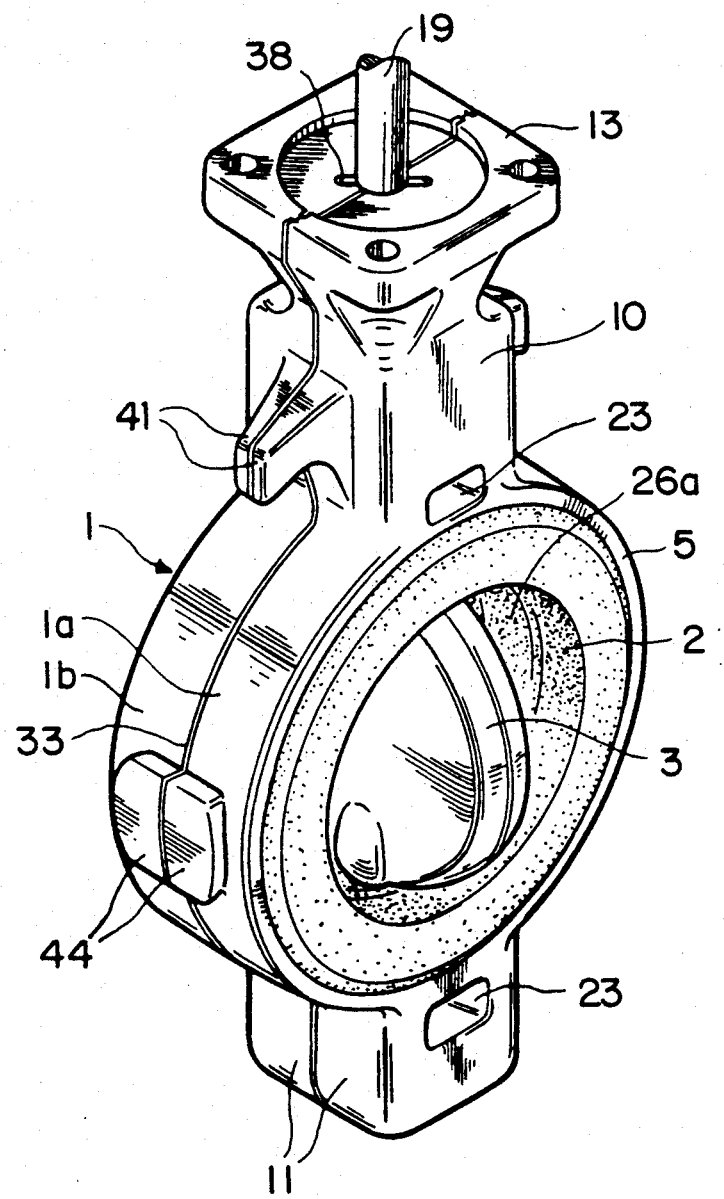
FIG. 1 is a perspective view of a butterfly valve according to this invention.

FIG. 1 shows the outer appearance of the complete invention including the valve body(1), the seated ring(2)and the valve(3). The valve body(1) is divided into parts(1a)(1b) along a division surface formed perpendicularly on the fluid passage, in other words, parallel to flange surface(5), and each part(1a)(1b) is constructed of synthetic resin material and joined together thereafter.

The divided parts(1a)(1b) of the valve body(1) are similar, and when joined, they become a one piece complete valve body.

Figure 2:
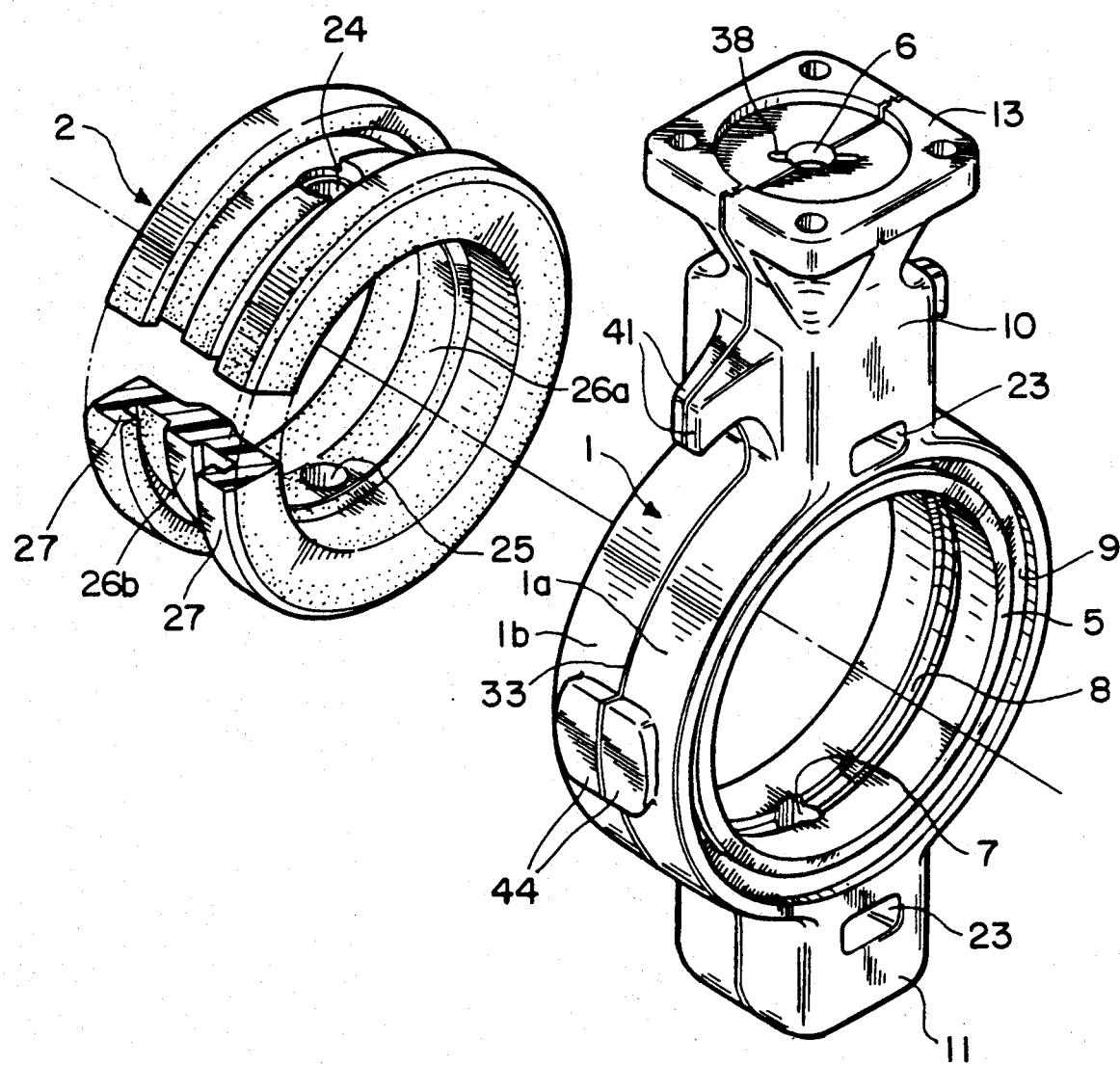
FIG. 2 is an exploded view of the valve and a seated ring.

In referring to FIG. 2 and FIG. 3, the valve body(1) is completed by joining the divided parts(1a)(1b) and the seated ring(2). Shaft holes(6)(7) are formed on each end of the valve body(1), while the annular recesses(8)(9) are established on the flange surface(5). In correspondence with the first shaft hole(6) a first shaft cylinder(10) is formed on the outer circumferential surface of the valve body(1), and the first shaft hole(6) runs through the shaft cylinder(10). This shaft hole(6) receives a stem(19), one end of which is attached to the valve while the other end extends outside of the valve body(1) so that it connects with some driving means. A setting flange(13) is formed on the outer end of the first shaft cylinder(10) for receiving the driving means for the stem(19). The first shaft cylinder(10) and the setting flange(13) are equally divided in the center along the division surface of the valve body(1), and also this equal division is true of the shaft holes(6)(7) and the inner annular recess(8), respectively.

The divided parts(1a)(1b) are preferrably joined by vibratory welding means which joins the above two parts by melted spots, but this joining can be also performed by ultrasonic welding or by adhesive agents.

Figure 4:
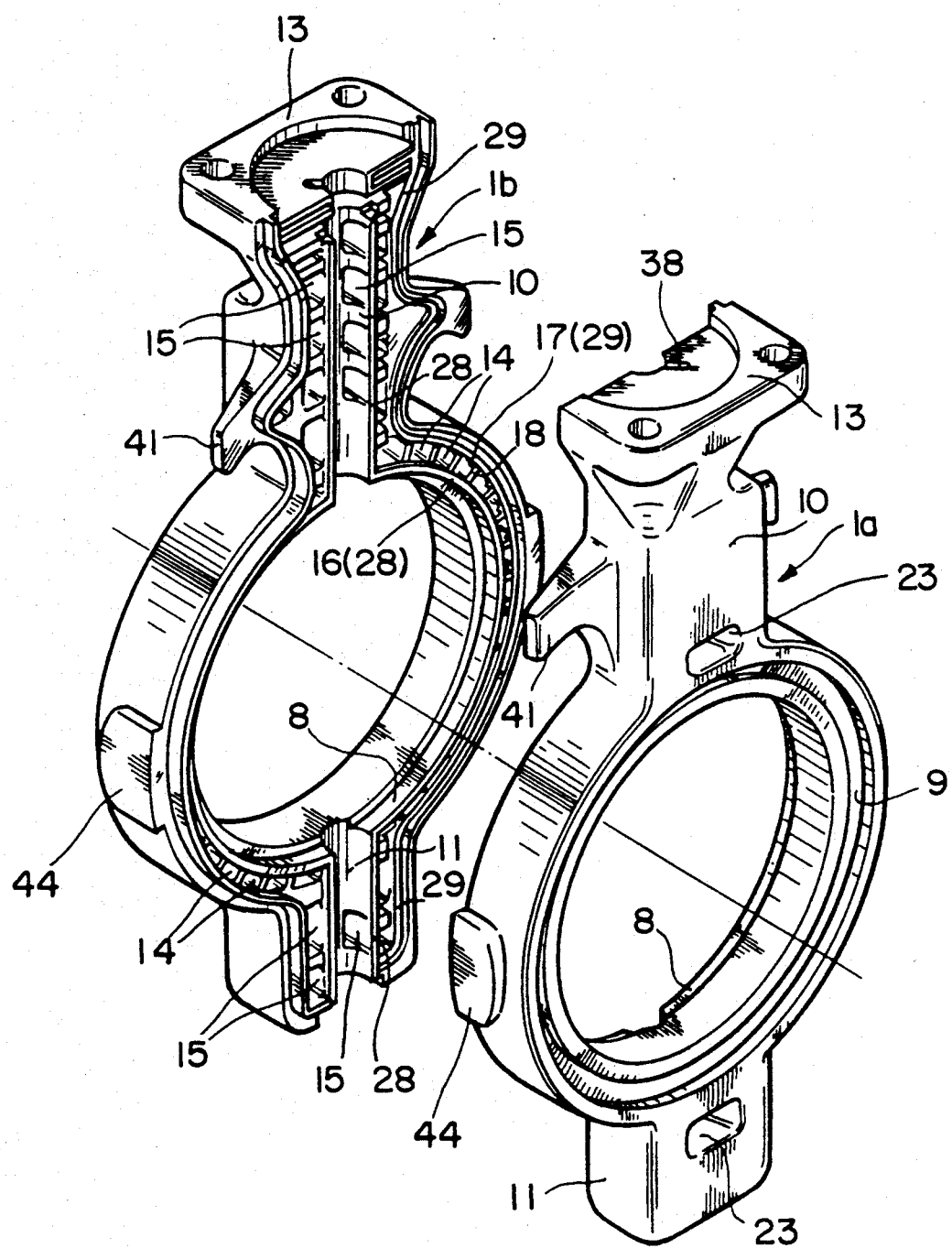
FIG. 4 is a perspective view of the divided parts of the valve before joining.
Figures 5, 6:
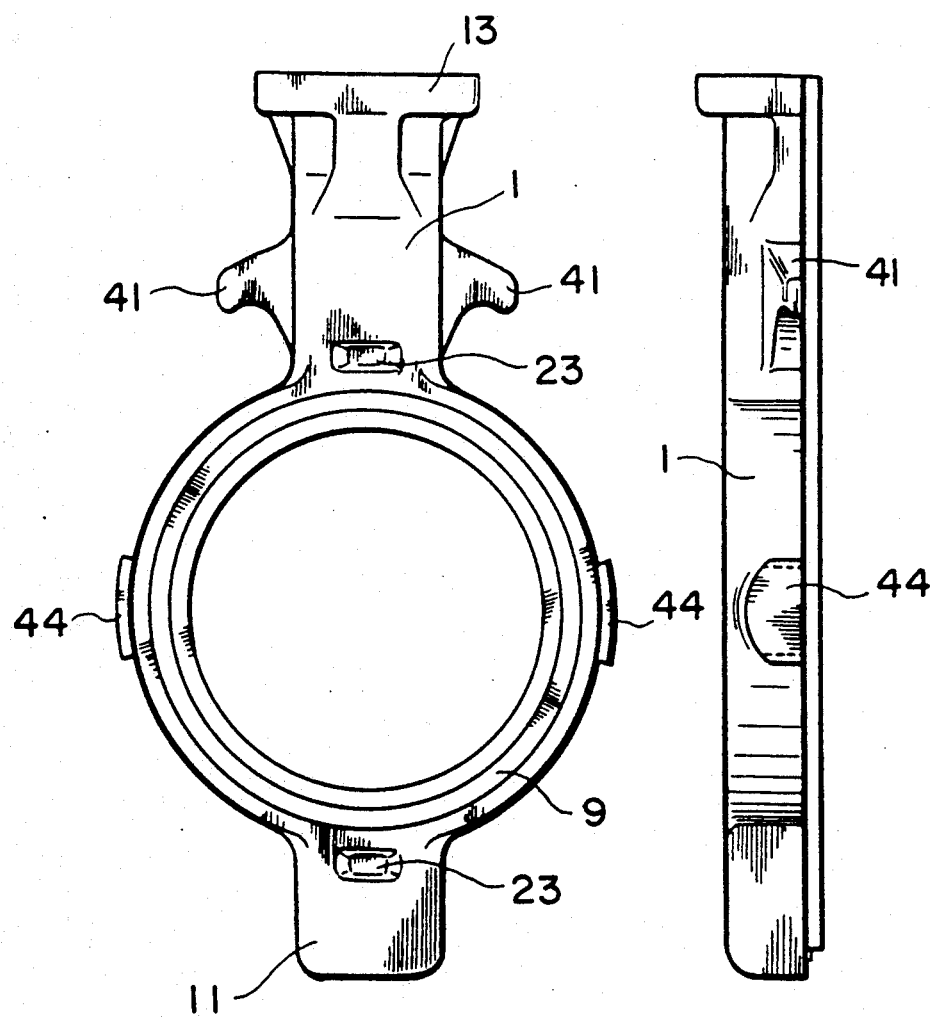
FIG. 5 is a front view of one divided part of the valve shown in FIG. 4.
FIG. 6 is a side view of one divided part of the valve shown in FIG. 4.
Figure 7:
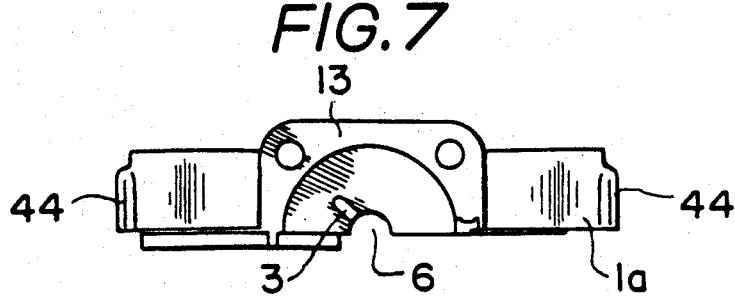
FIG. 7 is a flat view of the valve shown in FIG. 4.
Figure 8:
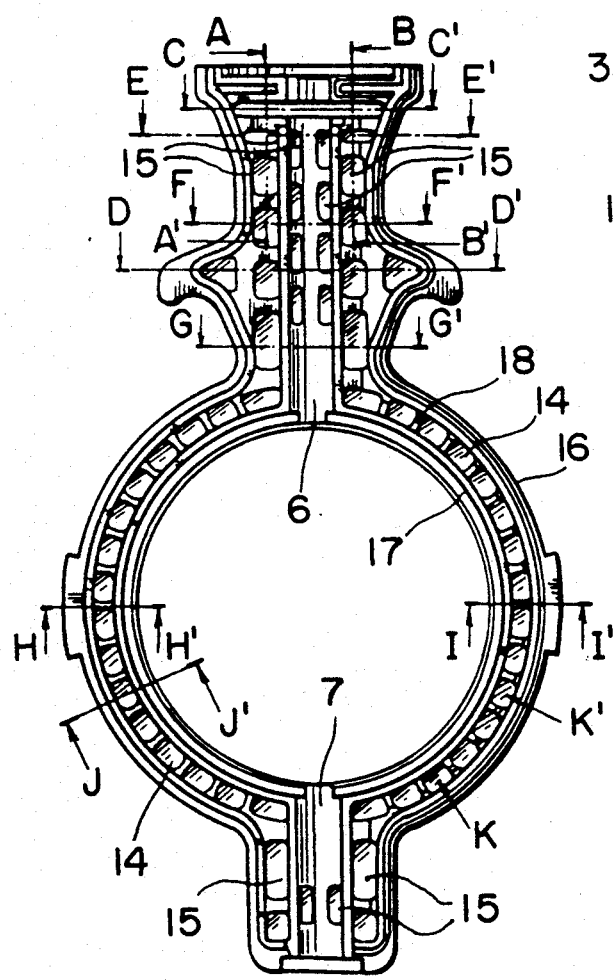
FIG. 8 is a rear view of one divided part of the valve.
Figure 20:
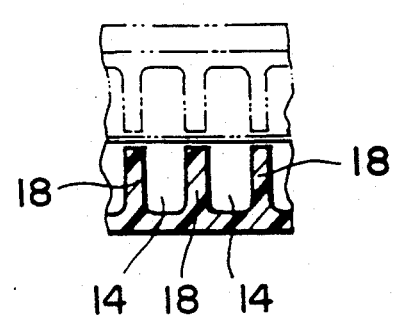
FIG. 20 is a sectional view of FIG. 8 along the line K—K'

Referring to FIG. 4.~FIG 20, the divided parts(1a)(1b) are shown before the joining process. On the joining surfaces of the divided parts(1a)(1b), there are formed plural cavity portions(14) (15) which are responsible for decreasing thickness and lessening weight. Cavity portions(14) are disposed around the circumference of the divided parts(1a)(1b), which supply a honeycomb-like structure connecting an outside ring(17) with an inside ring(16) by ribs(18). These portions(14) therefore create sturdiness of the valve body(1) and prevent the formation of bubbles which tend to invite distortion on the finishing surface.

The cavity portions(14) of the divided parts(1a)(1b) also produce an adiabatic space thereamong, which prevents sweating.

Figure 9:
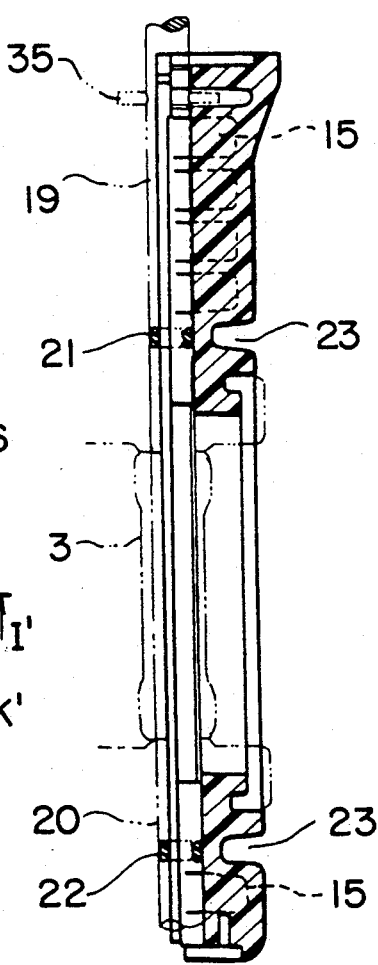
FIG. 9 is a longitudinal sectional view of the part shown in FIG. 8.
Figure 10:
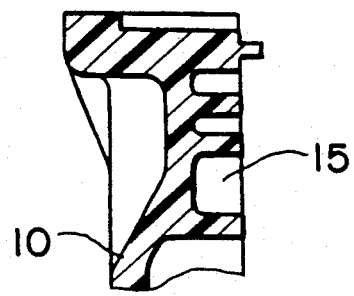
FIG. 10 is a sectional view of FIG. 8 along the line A—A'
Figure 11:
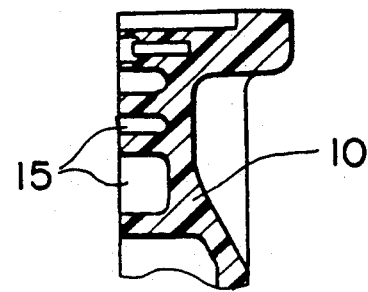
FIG. 11 is a sectional view of FIG. 8 along the line B—B'
Figure 12:
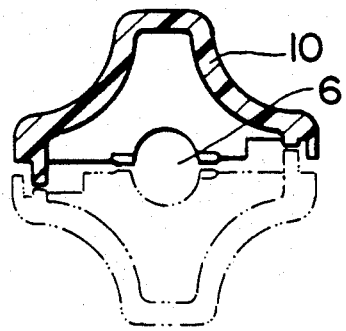
FIG. 12 is a sectional view of FIG. 8 along the line C—C'
Figure 13:
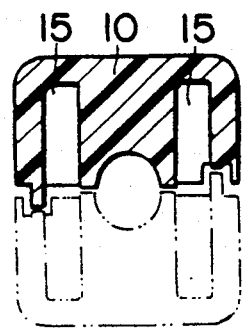
FIG. 13 is a sectional view of FIG. 8 along the line F—F'
Figure 14:
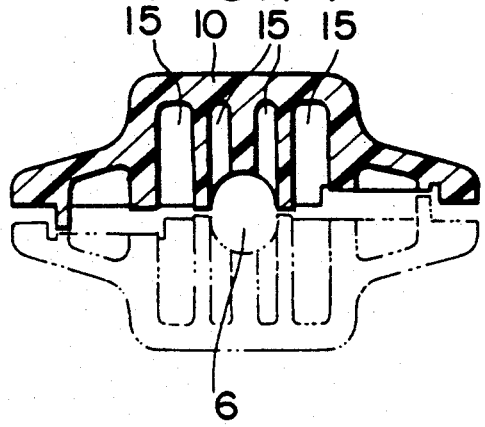
FIG. 14 is a sectional view of FIG. 8 along the line D—D'
Figure 15:
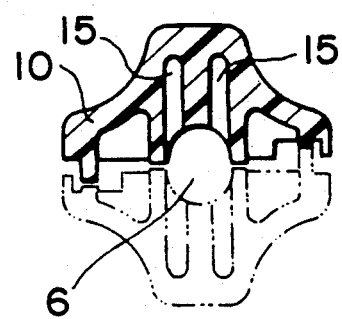
FIG. 15 is a sectional view of FIG. 8 along the line E—E'
Figure 16:
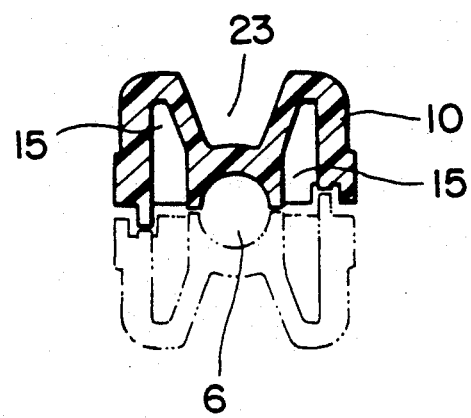
FIG. 16 is a sectional view of FIG. 8 along the line G—G'
Figure 17:
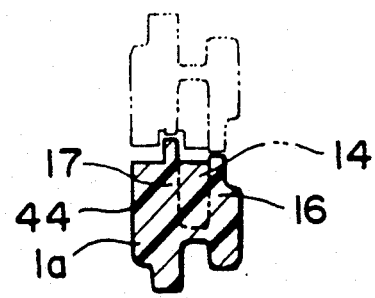
FIG. 17 is a sectional view of FIG. 8 along the line H—H'
Figure 18:
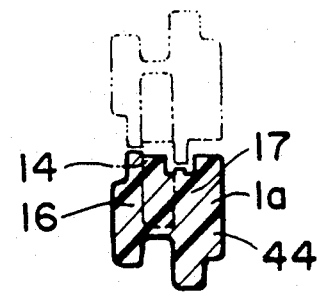
FIG. 18 is a sectional view of FIG. 8 along the line I—I'
Figure 19:
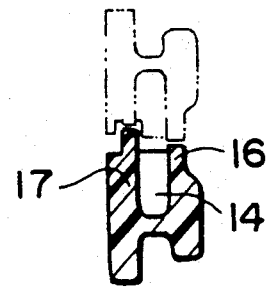
FIG. 19 is a sectional view of FIG. 8 along the line J—J'

The other cavity portions(15) formed on the first shaft cylinder(10)and the second shaft cylinder(11) are disposed along the shaft holes(6)(7) also. Where the O-rings(21)(22) are used(FIG. 9), a cavity finish is not used and therefore a hollowed part(23) is formed from the outside, so that satisfactory thickness is obtained.

The seated ring(2) consists of elastic sealing material like rubber, and shaft holes(24)(25)(FIG. 2) are drilled matching the shaft holes(6)(7) of the valve body(1) while an annular convex belt zone(26a) is established as a sealing portion at the center of the inner surface. In the center of the outer surface there is formed a similar annular convex belt zone(26b) which fits into the annular recess(8) of the valve body(1), while on the side edge of the seated ring(2) a transition collar(27) is formed to be fitted into the annular recesses(9) of the valve body(1) on the flange surface(5).

The joining process of the seated ring(2) and the valve body(1) has now been explained above, but this invention is not only limited with this combination, type, formation and so on. Those who have ordinary skills may easily understand other variations based on this description.

The divided parts(1a)(1b) are produced identically and each part should be fitted together correctly for accurate joining. Thus, only a single mold is required for the production of both parts(1a) and (1b). On both sides along the cavity portions(14)(15) rib faces(28)(29) are formed for the joining purpose. These rib faces(28)(29) become the end surface of inside and outside rings(16)(17), and at the portions(11) of the shaft cylinders(10)(11) the inner rib face(28) extends straight and outward along the shaft hole(6) while the outer rib face(29) extends outward almost along the line of the shaft cylinder(10).

Figure 21:
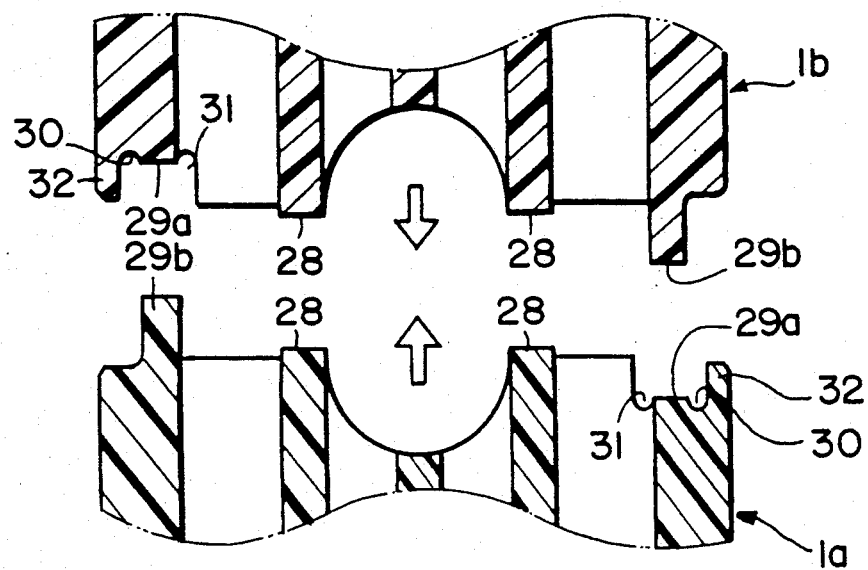
FIG. 21 is an enlarged sectional view showing the valve parts just before joining surfaces of each part.
Figure 22:
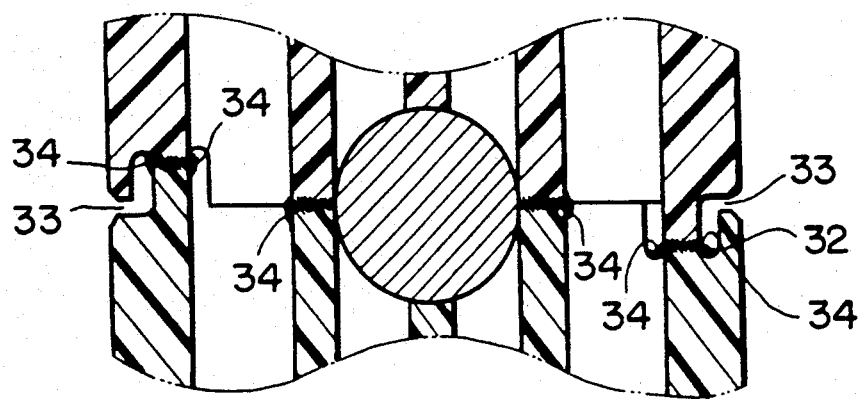
FIG. 22 is an enlarged sectional view showing the joining surfaces of each part.
Figure 23:
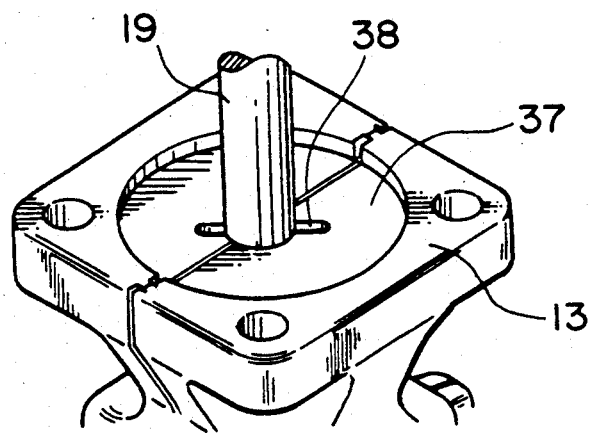
FIG. 23 is a partly perspective view of a shaft cylinder outer end portion showing the mechanism to prevent a stem from slipping out.
Figure 24:
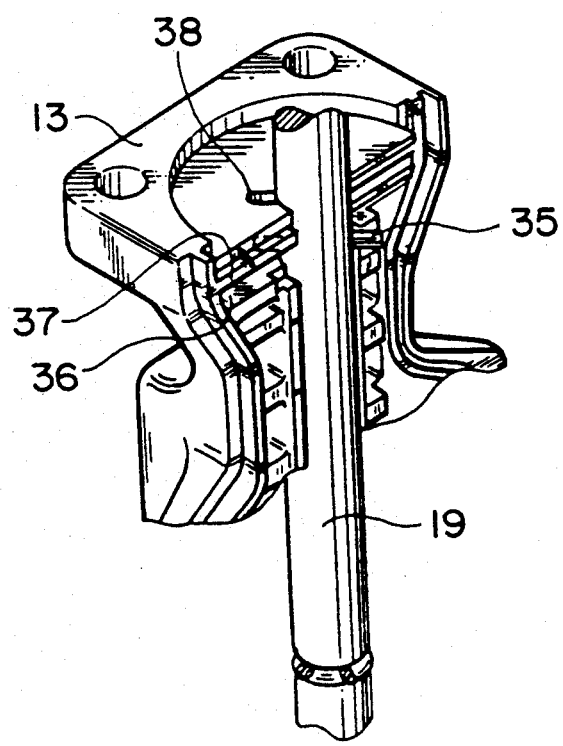
FIG. 24 is a perspective view of one divided part of the valve adjacent the shaft cylinder outer end portion.
Figure 25:
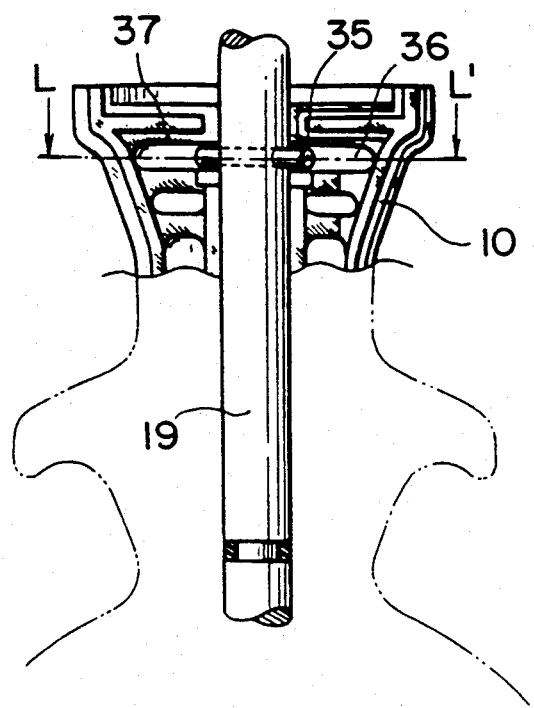
FIG. 25 is a front view of the part of the valve shown in FIG. 24.

In referring to FIG. 21 and FIG. 22, an outer rib face(29a), formed on the joining spot of the divided part(1a), is relatively short having recesses (30)(31) on both sides, while a corresponding rib face(29b), formed on the divided part(1b) is longer and extends to the divided part(1a). In addition, on the outside of the recess(30), an extending wall(32) is established. This extending wall(32) does not reach the outer surface of the part(1b) when these two parts(1a,1b) are joined together completely. In other words, when the divided parts(1a)(1b) are joined together, there exists a small gap(33) therebetween.

A slight distortion is unavoidable on the divided parts(1a)(1b) when they are produced by synthetic resin material during the production procedure caused by shrinkage or swelling. When these parts are joined, the ugly appearance on the joint spots is unavoidable. Therefore, in order to escape from an ugly appearance, this invention uses the gap(33).

The divided parts(1a)(1b) are joined by vibratory welding means as the rib faces(28)(29) are melted during the process. The preferrable melting width is 1.3 mm and the gap width is desirably around 1 mm. In this embodiment, the material used is obtained by mixing polyamid and polyphenylene ether, but of course other materials such as polyphenylene sulphide, nylon, and other compound materials or normal plastic are applicable. The material obtained by mixing polyamid and polyphenylene ether is generally used as the material for a motor boat screw: it is sturdy enough with water resistant quality; it is also obtainable at rather inexpensive costs. Polyphenylene sulphide has no water absorbing quality, and is very expensive. Nylon is considerably inexpensive, but it tends to deform easily against external forces.

As shown in FIG. 22, melted material(34) enters the recesses(30)(31), but it does not overflow on the outside using proper treatment.

With reference to FIG. 23~FIG. 26, on the outer end of the stem(19) a lock pin(35) in the first shaft cylinder(10) is inserted and adhered. The lock pin(35) is disposed rotatably in vacuum portions(36) neighboring the outer end of the first shaft cylinder(10), and it prevents the stem(19) from slipping out due to its close contact to upper wall(37) of the vacuum portions(36). On the upper wall(37) there is formed a slit(38) through which the lock pin(35) can be moved axially. The stem(19) is inserted with the lock pin(35) running through the slit(38), and the contact of the lock pin(35) with the upper wall(37) guarantees the stem(19) will stay.

Figure 26:
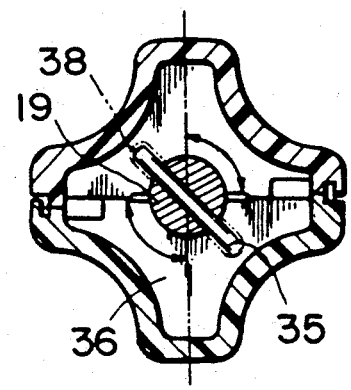
FIG. 26 is a sectional view of FIG. 25 along the line L—L'.

As shown in FIG. 26, the stem(19) rotates at 90 degree angle as indicated by the arrows and drives the valve(3) for opening or closing, which does not result in the slippage of the stem(19) in normal usage. In order to remove the stem(19), the stem(19) is rotated until the lock pin(35) is received by the slit(38).

The portion(36) which contains the lock pin(35) becomes a recess portion on the joining surface between each divided part(1a,1b), and when each divided part is joined an airtight space is established in the first shaft cylinder(11). This is important to make a joining effective for the divided parts(1a)(1b).

Figure 27:
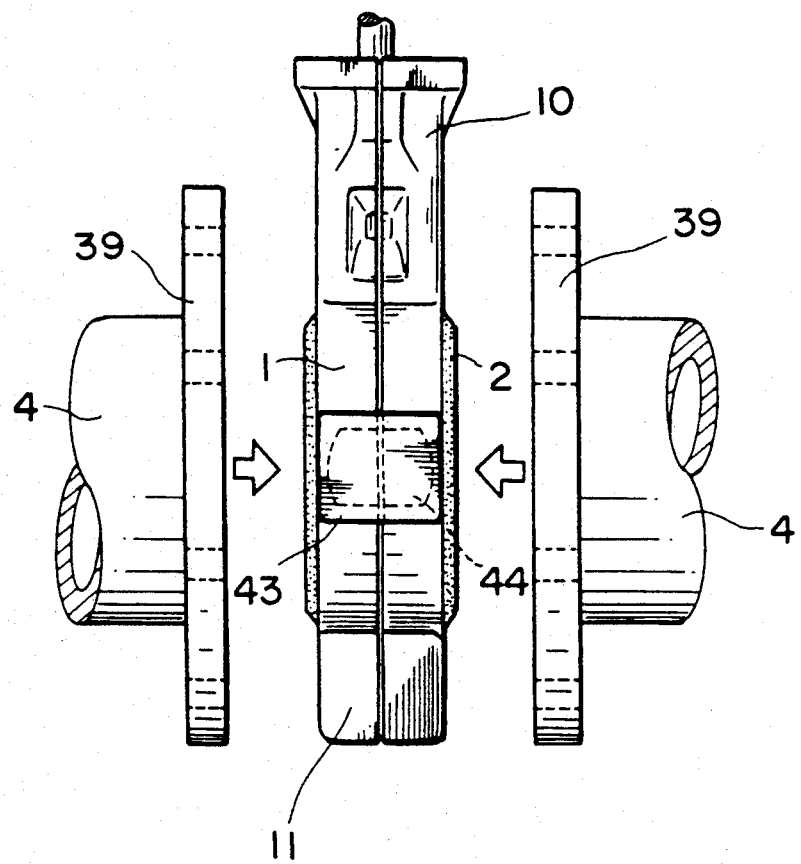
FIG. 27 is a side view showing the shaft cylinder about to be pinched between piping flanges.
Figure 28:
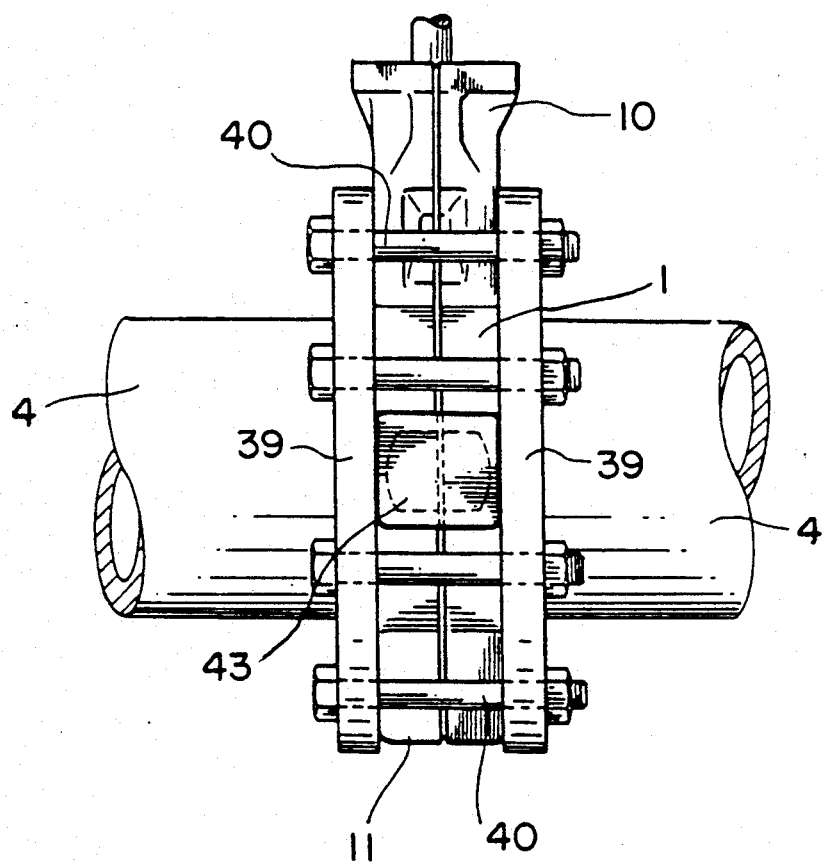
FIG. 28 is a side view showing the pinched shaft cylinder.

The thickness of the first shaft cylinder(10) and the second shaft cylinder(11) is defined by the thickness of the valve body, this thickness being the dimension between the two flanges(5)(5), and as shown in FIG. 27 and FIG. 28, when the butterfly valve is pinched between the piping flanges(39)(39) the neck portion is also pinched by the piping flanges(39)(39) as well as the valve body.

Thus, the shaft cylinders(10)(11) exhibit strong resistance against external impact or forces as they are pinched between the piping flanges(39)(39), which prevents the curving or breaking of the shaft cylinders(10)(11). Especially, the first shaft cylinder(10) extends outwardly, and further sturdiness is obtained by the pinching. As shown in FIG. 28, the fastening pressure caused by bolt-nut means(40) is decreased greatly as the pressure is applied for the flange(5) of the valve body and on the first/second cylinders(10)(11), respectively, whereas the fastening pressure does not cause the deformation of the valve body(1).

Figure 29:
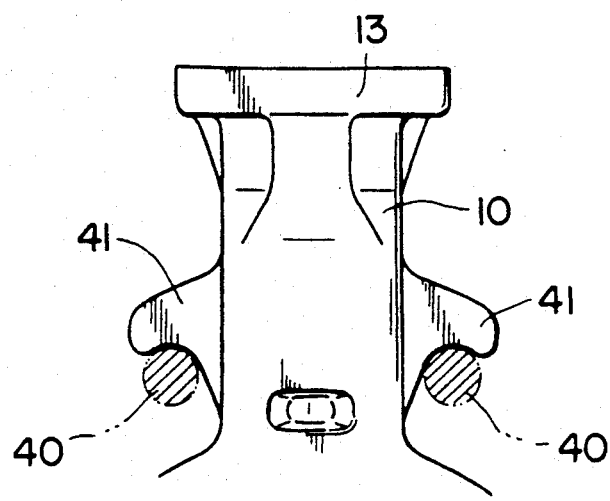
FIG. 29 is a side view of ribs formed on the shaft cylinder.
Figure 30:
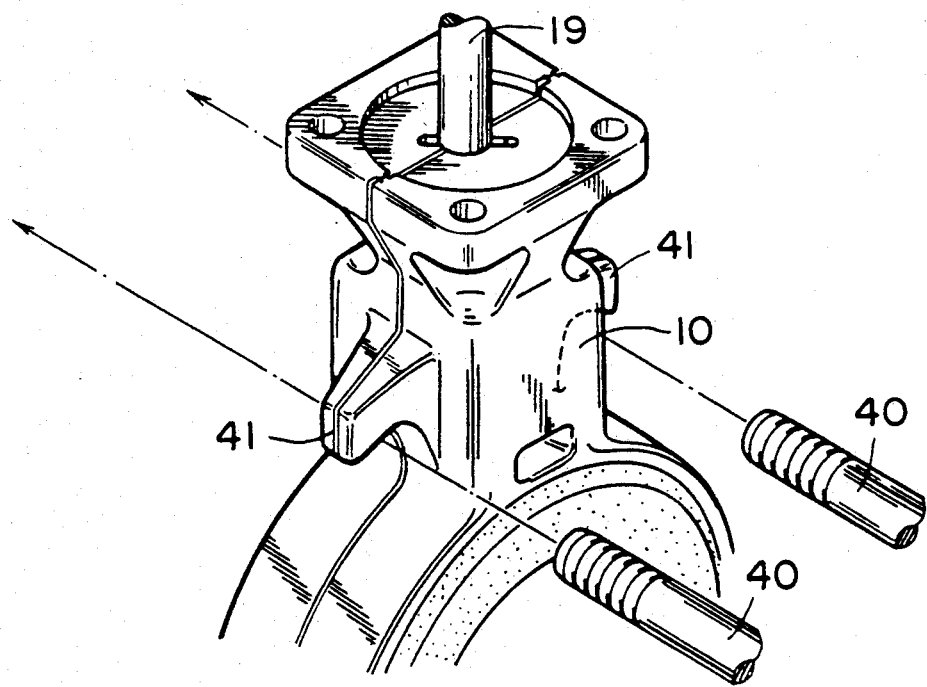
FIG. 30 is a perspective view showing the connections between the ribs and bolts.

With reference to FIG. 29 and FIG. 30, a rib (41) for bolt(40) is formed on both sides of the first shaft cylinder(10) and the bolt(40) is caught by the rib(41). In this manner, the butterfly valve and the piping is correctly and easily fitted together.

Figure 31:
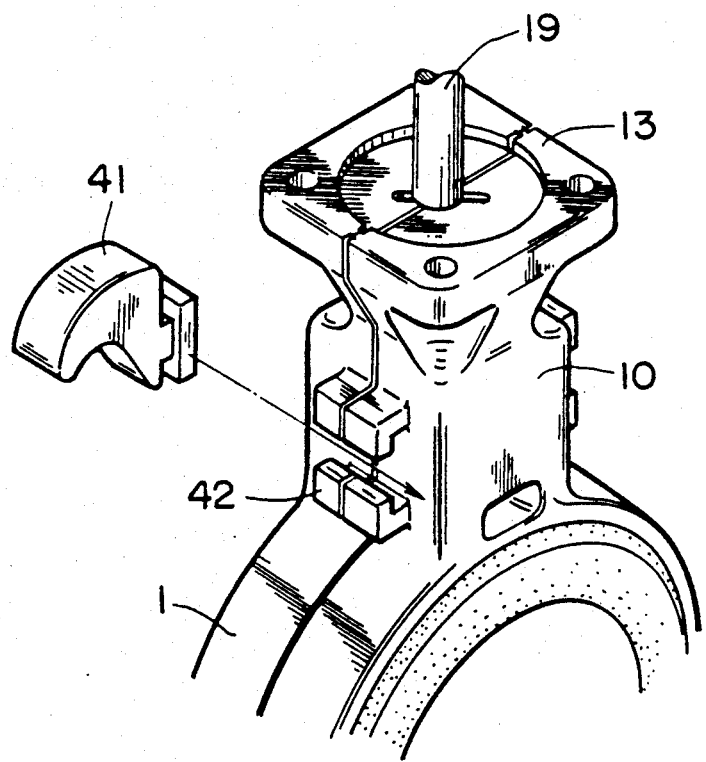
FIG. 31 is a perspective view showing another embodiment of the ribs for the bolt.

This rib(41) can be integral of the first shaft cylinder(10), or else, as shown in FIG. 31, it can be produced separately so that it is freely set on the rib rest(42) on both sides of the first shaft cylinder(10). Separate production allows for styles, sizes and so on of the ribs on demand, wherefore required ribs can be formed in accordance with different piping facilities.

Figure 32:
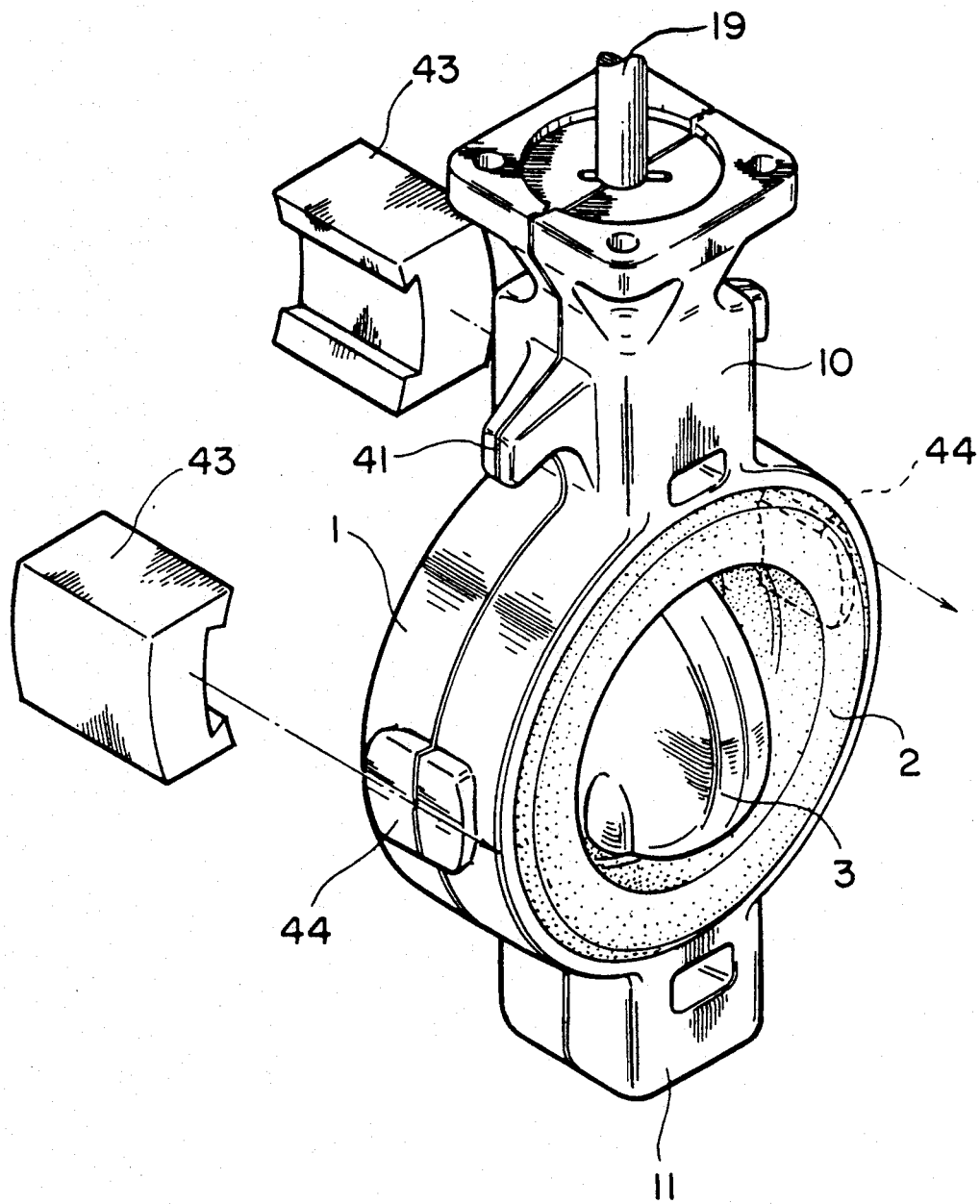
FIG. 32 is a perspective view showing the installation of a spacers.
Figure 33:
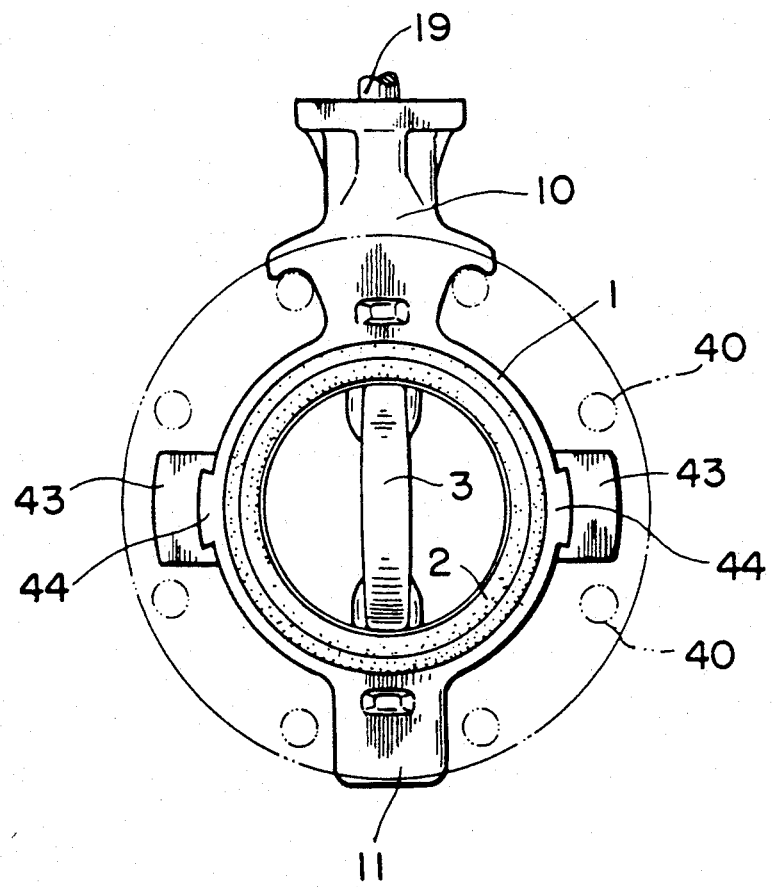
FIG. 33 is a front view of the valve shown in FIG. 32.

In referrence to FIG. 32 and FIG. 33, a pair of spacers(43) is prepared for free setting on the circumferential center of the valve body. Each spacer(43) has a proper thickness and width so that it acts as a support between the flanges(39)(39) when the flanges are fastened by bolt-nut means(40). In order to set this spacer(43), the spacer seat(44) is formed thereupon, and this spacer(43) is snapped in by sliding movement. Where the piping flange(39) is made from synthetic resin material, the flange(39) tends to move inwardly under fastening power of the bolt-nut means(40), but the spacer(43) can prevent such movement. When the piping flange(39) is made from metal or a similar sturdy material which does not need any support at all, the spacer is not used to lessen the weight.

Figure 34:
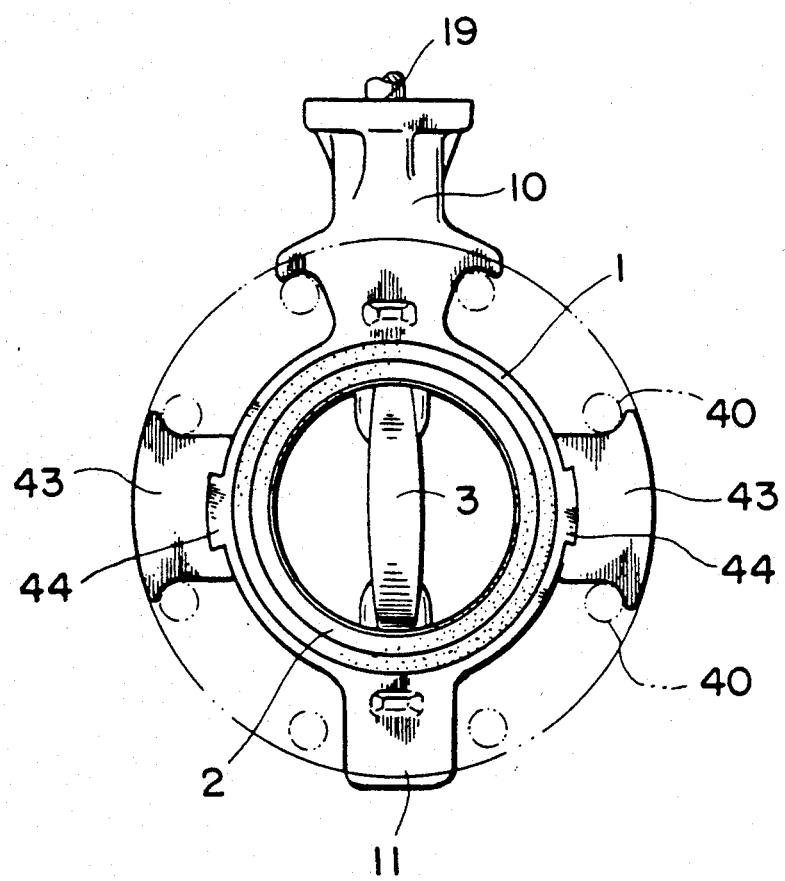
FIG. 34 is a front view showing another embodiment of the spacer installation.

FIG. 34 shows a different style of the spacer(43) which is formed in a semi-circular style whereon the fastening bolt-nut means(40) can rest. In this way, the exchange of the spacer(43) corresponds with the size of the piping facilities.

Figure 35:
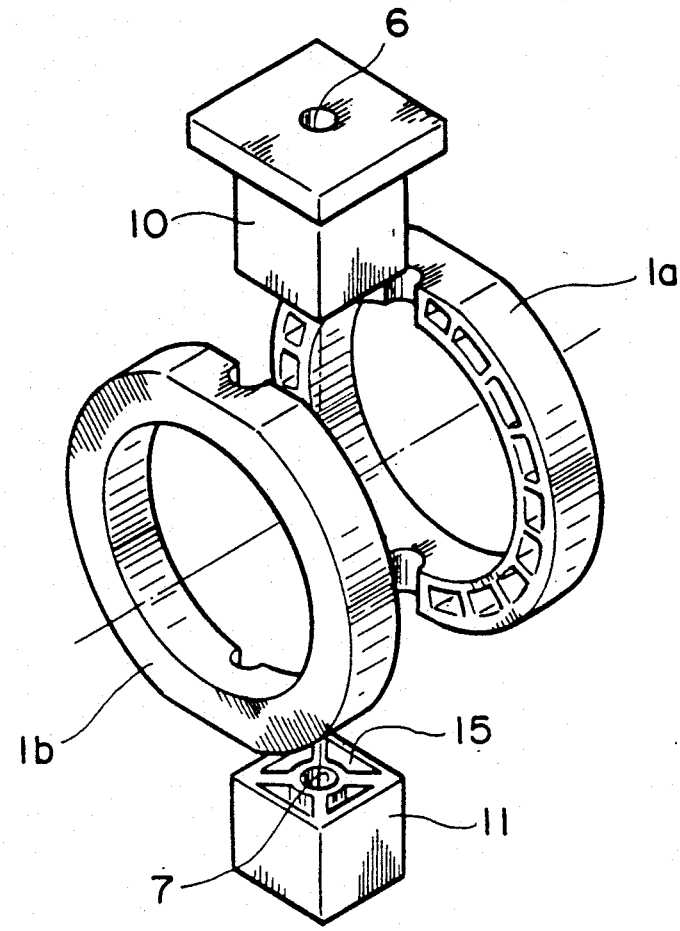
FIG. 35 is a schematic perspective view showing another embodiment of how the parts are divided.
Figure 36:
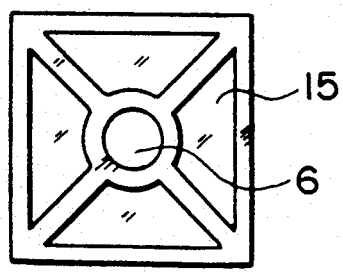
FIG. 36 and FIG. 37 are top and bottom views respectively of the joined surfaces of the shaft cylinder parts shown in FIG. 35.
Figure 37:
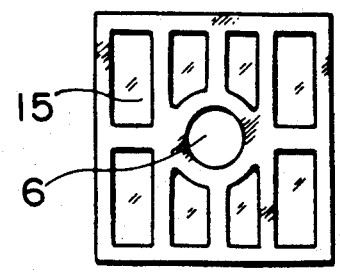

With reference to FIG. 35, the valve body(1) and the shaft cylinders(10)(11) are further divided, while the shaft cylinders(10)(11) are not divided. The shaft cylinders(10)(11) have plural cavity portions(15) for light weight and sturdiness. The examples of the cavity features are shown in FIG. 35 and FIG. 37, but the features are not only limited to these examples.

Referring to FIG.38~FIG. 47, they show the various embodiments in which the valve body(1) and the shaft cylinders(10)(11) are divided. FIG. 38 and FIG. 39 show the valve body(1) divided slantwise into two parts(1a)(1b). FIG. 40 and FIG. 41 show the valve body(1) divided not along the center, in other words, one part is a little bit larger.

FIG. 42 and FIG. 43 show the valve body(1) divided into three parts(1a)(1b)(1c).

FIG. 44 and FIG. 45 show the transformed embodiment in FIG. 42 and FIG. 43, while one part(1c) is further divided into two parts(1c')(1c''). In this case, the shaft hole(45) is formed in the side parts(1a)(1b).

FIG. 46 and FIG. 47 are also the transformed embodiment of FIG. 42 and FIG. 43, where the center part(1c) is equipped with the shaft holes(6)(7) accordingly.

FIG. 48~FIG. 50 show examples of equipment used to seal the shaft of the stem(19) on the driving side. An elastic sealing plate(46) is placed on the setting flange(13) at the outer end of the first shaft cylinder(10) to hold stably the stem(19) with a fixed plate(47) between the upper part of the flange(13) and the sealing plate(46).

On the center of the sealing plate(46) and the fixed plate(47), an aperture(48) is drilled. In the inner surface of the sealing plate(46) there is formed a concave strip(49) which attains a sealing effect by closely contacting the outer surface of the stem(19). This sealing plate(46) is made of a rigid synthetic resin material(50) which becomes one part of the rubber elastic material(51)(52).

The sealing plate(46) held by the setting flange(13) and the fixed plate(47) is further pinched by bolt-nut means(53).

Thus, this equipment prevents the deterioration of the stem(19) when it is fitted with an O-ring.

FIG. 51~FIG. 53 also show the equipment used on the other end of the stem(19). On the outer end of the second shaft cylinder(11), there is formed a concave zone(54) into which a packing plate(55) and a cap(56) are inserted, whereby they are fastened solidly by a small screw(57).

The characteristics of this invention realized by the aforesaid embodiments are now explained: The valve body is divided into plural parts, each divided part including cavity portions for forming a so-called honeycomb-like structure which achieves light weight and increased sturdiness, and thus the valve body is available to be made from a synthetic resin material.

The divided parts are joined by vibratory welding means, melting the joining spots thereupon, whereas satisfactory sealing is obtained.

On the circumferential surface where the joining is accomplished, small gaps are established without any direct contact between each joining surface for the divided parts, which supplies a good appearance all over even if some distortions exist.

A recess and the wall prevent overflow of melted materials on the surface, which prevents burs from forming and any extra treating.

The thickness of the shaft cylinder is almost the same as that of the valve body, and when the valve body is held between the piping flanges the shaft cylinder is also held together, whereas the durability of the shaft, especially on the driving side where the shaft extends outside, is enhanced greatly, in order that the shaft be protected from external shock or pressures.

On the both sides of the shaft cylinder, ribs for bolts are established, wherein a fastening bolt rests, which results in the simple and easy connection of the butterfly valve with the pipe.

On the outer circumference of the valve body, the spacer which has the same thickness of the valve body is set and this spacer has the role of supporting between the piping flanges, preventing the flanges from moving inwardly, and thereby it increases the sturdiness of the piping flange especially if this flange is made from synthetic resin material. This spacer is not mandatory so that the total weight of the valve body can be further decreased.

What is claimed is:

1. In a butterfly valve, including: a valve body made from synthetic resin material having an internal cylindrical fluid passage; a movable disk valve positioned in the valve body for the opening and closing of the fluid passage; a seated ring made from elastic sealing material inserted between the valve body and the disk valve for closing the fluid passage in contact with the valve in a closed position; a shaft hole formed in the valve body into which a stem is inserted; a shaft cylinder formed to extend outwardly from an outer circumference of the valve body in correspondence with the shaft hole; and, the stem being inserted into the shaft cylinder and holding the valve axially, the improvement comprising:
   a) the valve body is divided along at least one division surface formed across the fluid passage and is composed of plural divided parts;
   b) each divided part is joined together continuously and directly at respective joined surfaces, extending circumferentially on each divided part to form one complete valve body and is produced with a plurality of internal cavity portions; and
   c) the seated ring is fitted into an inner circumference of the valve body,
   wherein the joined surfaces of the divided parts protrude outwardly and a gap is formed along the joined surfaces when the divided parts are joined.

2. The valve according to claim 1, wherein the divided parts are welded together.

3. The valve according to claim 2, wherein the welding is by vibratory welding means after each joined surface of the divided parts is directly joined.

4. The valve according to claim 2, wherein the welding is by ultrasonic welding means after each joined surface of the divided parts is directly joined.

5. The valve according to claim 1, wherein the divided parts are joined by an adhesive after each joined surface of the divided parts is directly joined.

6. The valve according to claim 1, wherein the at least one division surface extends through the shaft cylinder.

7. The valve according to claim 1, wherein the shaft cylinder is produced separately and joined with the shaft hole seating perpendicularly in the valve body.

8. The valve according to claim 6, wherein a plurality of cavity portions are also formed in the shaft cylinder.

9. The valve according to claim 1, wherein two division surfaces are formed extending in parallel, which enables the valve body to be divided into three pieces.

10. In a butterfly valve, including: a valve body made from synthetic resin material having an internal cylindrical fluid passage; a movable disk valve positioned in the valve body for the opening and closing of the fluid passage; a seated ring made from elastic sealing material inserted between the valve body and the disk valve for closing the fluid passage in contact with the valve in a closed position; a shaft hole formed in the valve body into which a stem is inserted; a shaft cylinder formed to extend outwardly from an outer circumference of the valve body in correspondence with the shaft hole; and, the stem being inserted into the shaft cylinder and holding the valve axially, the improvement comprising:
   a) the valve body is divided along at least one division surface formed across the fluid passage and is composed of plural divided parts;
   b) each divided part is joined together continuously and directly at respective joined surfaces, extending circumferentially on each divided part to form one complete valve body and is produced with a plurality of internal cavity portions; and
   c) the seated ring is fitted into an inner circumference of the valve body,
   wherein each joined surface includes a rib face, each rib face being in contact with another and at least one rib face being formed on one divided part being longer than a corresponding rib face to which it is in contact with.

11. The valve according to claim 2, wherein recesses are formed on the joining surfaces, which accept accumulation of melting materials.

12. The valve according to claim 11, wherein a wall is formed adjacent to the recesses to prevent overflow of melted material.

13. The valve according to claim 1, wherein removal of the stem from the valve body is prevented by:
   vacuum portions formed in the outer end of the shaft cylinder;
   a slit formed in the upper wall of the vacuum portions; and
   a lock pin contacting the upper wall to prevent the slipping out of the stem.

14. The valve according to claim 1, wherein the thickness of the valve body and that of the shaft cylinder on the side in parallel to the fluid direction are the same.

15. The valve according to claim 1, wherein ribs are formed on both sides of the shaft cylinder to receive fastening bolts.

16. The valve according to claim 1, wherein a spacer is removably connected to the outer surface of the valve body and the spacer has a width the same as the thickness of the valve body.

17. The valve according to claim 7, wherein a plurality of cavity portions are also formed in the shaft cylinder.

18. The valve according to claim 3, wherein recesses are formed on the joining surfaces, which accept accumulation of melting materials.

19. The valve according to claim 10, wherein the divided parts are welded together.

20. The valve according to claim 19, wherein the welding is by vibratory welding means after each joined surface of the divided parts is directly joined.

21. The valve according to claim 19, wherein the welding is by ultrasonic welding means after each joined surface of the divided parts is directly joined.

22. The valve according to claim 10, wherein the divided parts are joined by an adhesive after each joined surface of the divided parts is directly joined.

23. The valve according to claim 10, wherein the joined surfaces of the divided parts protrude outwardly and a gap is formed along the joined surfaces when the divided parts are joined.

24. The valve according to claim 10, wherein the at least one division surface extends through the shaft cylinder.

25. The valve according to claim 10, wherein the shaft cylinder is produced separately and joined with the shaft hole seating perpendicularly in the valve body.

26. The valve according to claim 24, wherein a plurality of cavity portions is also formed in the shaft cylinder.

27. The valve according to claim 10, wherein two division surfaces are formed extending in parallel, which enables the valve body to be divided into three pieces.

28. The valve according to claim 19, wherein recesses are formed on the joining surfaces, which accept accumulation of melting material.

29. The valve according to claim 28, wherein a wall is formed adjacent to the recesses to prevent overflow of melted material.

30. The valve according to claim 10, wherein removal of the stem from the valve body is prevented by:
   vacuum portions formed in the outer end of the shaft cylinder;
   a slit formed in the upper wall of the vacuum portions; and
   a lock pin contacting the upper wall to prevent the slipping out of the stem.

31. The valve according to claim 10, wherein the thickness of the valve body and that of the shaft cylinder on the side in parallel to the fluid direction are the same.

32. The valve according to claim 10, wherein ribs are formed on both sides of the shaft cylinder to receive fastening bolts.

33. The valve according to claim 10, wherein a spacer is removably connected to the outer surface of the valve body and the spacer has a width the same as the thickness of the valve body.

34. The valve according to claim 25, wherein a plurality of cavity portions is also formed in the shaft cylinder.

35. The valve according to claim 20, wherein recesses are formed on the joining surfaces, which accept accumulation of melting material.

36. The valve according to claim 1, wherein each joined surface includes a rib face, each rib face being in contact with another and at least one rib face being formed on one divided part being longer than a corresponding rib face to which it is in contact with.

* * * * *